US 009970482B2

United States Patent
Garrison

(10) Patent No.: US 9,970,482 B2
(45) Date of Patent: *May 15, 2018

(54) CIRCUMFERENTIAL BACK-TO-BACK SEAL ASSEMBLY WITH BIFURCATED FLOW

(71) Applicant: Stein Seal Company, Kulpsville, PA (US)

(72) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 507 days.

This patent is subject to a terminal disclaimer.

(21) Appl. No.: 14/845,947

(22) Filed: Sep. 4, 2015

(65) Prior Publication Data

US 2016/0053808 A1 Feb. 25, 2016

Related U.S. Application Data

(63) Continuation-in-part of application No. 14/396,101, filed as application No. PCT/US2014/033736 on Apr. 11, 2014, now Pat. No. 9,194,424.

(Continued)

(51) Int. Cl.
*F16J 15/40* (2006.01)
*F16C 32/06* (2006.01)
(Continued)

(52) U.S. Cl.
CPC .......... *F16C 32/0662* (2013.01); *F01D 11/04* (2013.01); *F01D 25/22* (2013.01);
(Continued)

(58) Field of Classification Search
CPC .... F16J 15/40; F16J 15/44; F16J 15/16; F16J 15/30; F16J 15/441; F16J 15/442; F16J 15/3244; F16J 15/3404–15/3432
See application file for complete search history.

(56) References Cited

U.S. PATENT DOCUMENTS 5,441,283 A * 8/1995 Pecht ................... F16J 15/3412
277/400
5,529,317 A * 6/1996 Muller ................ F16J 15/3404
277/400
(Continued)

FOREIGN PATENT DOCUMENTS

EP 0745794 A1 12/1996
EP 0935086 B1 11/2004

OTHER PUBLICATIONS

Reply to International Search Report and Written Opinion for Patent Cooperation Treaty Application No. PCT/US2016/048309.
(Continued)

*Primary Examiner* — Vishal A Patel
(74) *Attorney, Agent, or Firm* — Michael Crilly, Esquire

(57) ABSTRACT

A circumferential seal assembly capable of separating a gas into two separate flow paths before communication between a rotatable runner and a pair of seal rings is presented. The seal assembly includes an annular seal housing, a pair of annular seal rings, a rotatable runner, and a plurality of groove structures. The seal housing is interposed between a pair of compartments. The seal rings are separately disposed within the seal housing and separately disposed around the rotatable runner. The groove structures are disposed along an outer annular surface of the rotatable runner. A gas is communicable onto the groove structures. Each groove structure includes at least two hydrodynamic grooves that separate and communicate the gas onto the seal rings. Each groove includes steps whereby the depth of at least one adjoining step decreases in the direction opposite to rotation with or without the depth of another adjoining steps increasing in the direction opposite to rotation.

30 Claims, 20 Drawing Sheets

Related U.S. Application Data

(60) Provisional application No. 61/811,900, filed on Apr. 15, 2013.

(51) Int. Cl.
  *F16J 15/44* (2006.01)
  *F01D 11/04* (2006.01)
  *F01D 25/22* (2006.01)

(52) U.S. Cl.
  CPC ...... *F16C 32/0607* (2013.01); *F16C 32/0625* (2013.01); *F16J 15/40* (2013.01); *F16J 15/441* (2013.01); *F16J 15/442* (2013.01); *F05D 2250/75* (2013.01); *F16C 2360/23* (2013.01)

(56) References Cited

U.S. PATENT DOCUMENTS

| | | | | |
|---|---|---|---|---|
| 7,134,667 B2* | 11/2006 | Weiler | ............ | F16J 15/164 277/424 |
| 2003/0209859 A1* | 11/2003 | Young | ............ | F16J 15/3424 277/400 |
| 2011/0049809 A1* | 3/2011 | Garrison | ............ | F01D 25/183 277/304 |
| 2011/0210518 A1 | 9/2011 | Vasagar et al. | | |
| 2012/0217703 A1 | 8/2012 | Garrison | | |
| 2012/0280456 A1* | 11/2012 | Young | ............ | F16J 15/3412 277/400 |
| 2013/0241153 A1* | 9/2013 | Garrison | ............ | F01D 11/02 277/350 |
| 2015/0049968 A1 | 2/2015 | Garrison | | |

OTHER PUBLICATIONS

Phase II Demand filed in response to the International Search Report and Written Opinion for Patent Cooperation Treaty Application No. PCT/US2016/048309.

International Preliminary Examination Report issued by the South Korean Intellectual Property Office (KIPO) for Patent Cooperation Treaty Application No. PCT/US2016/048309.

\* cited by examiner $L = L_d \cos(\alpha)$

CIRCUMFERENTIAL BACK-TO-BACK SEAL ASSEMBLY WITH BIFURCATED FLOW

CROSS REFERENCE TO RELATED APPLICATIONS

This application is a continuation-in-part application of U.S. patent application Ser. No. 14/396,101 filed Oct. 22, 2014 which is a National Phase of PCT Application No. PCT/US2014/033736 filed Apr. 11, 2014 which further claims priority from U.S. Provisional Application No. 61/811,900 filed Apr. 15, 2013, each entitled Circumferential Back-to-Back Seal Assembly with Bifurcated Flow. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a circumferential seal assembly with bifurcated hydrodynamic flow for use within a gas turbine engine and more particularly is concerned, for example, with a pair of annular seal rings separately disposed within an annular seal housing about a rotatable runner attached to a shaft, wherein the runner further includes a plurality of stepped hydrodynamic grooves which separate and direct flow onto each annular seal ring to form a pair of thin-film layers sealing one compartment from another compartment.

2. Background

Turbine engines typically include a housing with a plurality of compartments therein and a rotatable shaft that passes through adjoining compartments separately including a gas and a lubricant. Leakage of a lubricant from one compartment into another compartment containing a gas could adversely affect performance and function of a gas turbine. Leakage of a gas from one compartment into another compartment containing a lubricant is likewise detrimental. As such, adjoining compartments must be isolated from one another by means of a sealing system that prevents one fluid, either a lubricant or a gas, from migrating along a rotatable shaft and entering a compartment so as to mix with another fluid therein.

In the case of an aircraft engine, leakage of a lubricant or a gas across a seal into a neighboring compartment may cause oil coking or an engine fire. Oil coke is a byproduct formed when an oil lubricant and a gas mix at a temperature that chemically alters the oil. Oil coke can foul sealing surfaces thereby degrading bearing lubrication and impairing the integrity of a seal. It is important in similar applications, not just aircraft engines, that a lubricant be isolated within a lubricant sump and that a seal around a rotating shaft not allow a lubricant to escape the sump or a hot gas to enter the sump. Many applications will include either a circumferential seal or a face seal to prevent mixing of an oil lubricant and a hot gas; however, circumferential shaft seals are the most widely used under the above-noted conditions.

Various circumferential seal systems are employed within the art to form a seal between a compartment containing a gas at a high pressure and a compartment containing an oil lubricant at a low pressure. Sealing systems typically include grooves disposed along an inner annular surface of a seal ring to form a thin-film layer between the seal ring and a shaft.

Presently known circumferential seal designs are problematic when both adjoining compartments are at a low pressure. The absence of a significant pressure differential between compartments does not permit formation of a thin-film layer adequately capable of preventing migration of a fluid along the interface between a seal ring and a shaft.

Presently known circumferential seal designs are further problematic when used in conjunction with a translatable runner. The temperatures and/or mechanical loads within a turbine engine often cause a runner, and sealing surface thereon, to translation along the axial dimension of an engine. The result is a sealing interface that is difficult to optimize over the operational range of a turbine engine.

Accordingly, what is required is a circumferential seal assembly interposed between a pair of compartments that minimizes degradation to and/or failure of a seal between a rotatable runner and a pair of seal elements.

SUMMARY OF THE INVENTION

An object of the invention is to provide a circumferential seal assembly interposed between a pair of compartments that minimizes degradation to and/or failure of a seal between a rotatable runner and a pair of seal elements.

In accordance with some embodiments of the invention, the circumferential back-to-back seal assembly includes an annular seal housing, a first annular seal ring, a second annular seal ring, a rotatable runner, and a plurality of groove structures. The annular seal housing is interposed between a pair of compartments. The annular seal housing has at least one inlet. The first and second annular seal rings are separately disposed within the annular seal housing. A gas is communicable between the first and second annular seal rings via the inlet(s). The first and second annular seal rings are disposed around the rotatable runner. The groove structures are disposed along an outer annular surface of the rotatable runner. The gas is communicable onto the groove structures. Each groove structure separates the gas so that a first portion of the gas is directed onto the first annular seal ring to form a first thin-film layer between the rotatable runner and the first annular seal ring and a second portion of the gas is directed onto the second annular seal ring to form a second thin-film layer between the rotatable runner and the second annular seal ring. Each groove structure has at least two grooves. Each groove includes at least two adjoining steps wherein each adjoining step has a base disposed at a depth (h). The depth (h) decreases from at least one said adjoining step to another said adjoining step in the direction opposite to rotation. A shoulder is disposed between two adjoining steps whereby the shoulder locally redirects the gas outward toward the first annular seal ring or the second annular seal ring so that flow of the gas is turbulent.

In accordance with some embodiments of the invention, the circumferential back-to-back seal assembly includes an annular seal housing, a first annular seal ring, a second annular seal ring, a rotatable runner, and a plurality of groove structures. The annular seal housing is interposed between a pair of compartments. The first and second annular seal rings are separately disposed within the annular seal housing. The rotatable runner includes a plurality of through holes. The first and second annular seal rings are disposed around the rotatable runner. The groove structures are disposed along an outer annular surface of the rotatable runner. A gas is communicable onto the groove structures via the through holes. Each groove structure separates the gas so that a first portion of the gas is directed onto the first annular seal ring to form a first thin-film layer between the rotatable runner and the first annular seal ring and a second portion of the gas is directed onto the second annular seal ring to form a second thin-film layer between the rotatable runner and the second annular seal ring. Each groove structure has at least two grooves. Each groove includes at least two adjoining steps wherein each adjoining step has a base disposed at a depth (h). The depth (h) decreases from at least one said adjoining step to another said adjoining step in the direction opposite to rotation. A shoulder is disposed between two adjoining steps whereby the shoulder locally redirects the gas outward toward the first annular seal ring or the second annular seal ring so that flow of the gas is turbulent.

In accordance with other embodiments of the invention, the depth (h) increases from at least one adjoining step to another adjoining step in the direction opposite to rotation.

In accordance with other embodiments of the invention, each groove has a length (L) and is disposed along the rotatable runner having a runner radius ($r_r$). Each groove has one adjoining step at a minimum depth ($h_{min}$) and other adjoining step at a maximum depth ($h_{max}$). The distance ratio (R), representative of the radial distance (r) of the base over the runner radius ($r_r$), is determined from the equation:

$$R = \frac{\sqrt{\left(r_r^2 - \left(\frac{L}{2}\right)^2\right)} - h}{r_r}$$

In accordance with other embodiments of the invention, each distance ratio (R) for each groove includes a lower distance ratio ($R_L$) when the depth (h) equals the maximum depth ($h_{max}$) and an upper distance ratio ($R_U$) when the depth (h) equals the minimum depth ($h_{min}$). The distance ratio (R) for each adjoining step is within the range from the lower distance ratio ($R_L$) to the upper distance ratio ($R_U$).

In accordance with other embodiments of the invention, the seal assembly further includes a plurality of springs. The springs are disposed between and directly contact the first and second annular seal rings. The springs separate the first and second annular seal rings to form a gap. The gas traverses the gap before communication onto the groove structures.

In accordance with other embodiments of the invention, the seal assembly further includes a plurality of springs. The springs are disposed between and directly contact the first and second annular seal rings. The springs separate the first and second annular seal rings.

In accordance with other embodiments of the invention, a center ring is disposed within the annular seal housing between the first annular seal ring and the second annular seal ring.

In accordance with other embodiments of the invention, the seal assembly further includes a center ring and a plurality of springs. The center ring is disposed within the annular seal housing between the first and second annular seal rings. The center ring includes a plurality of holes communicable with the inlet(s) that allow the gas to traverse the holes before communication onto the groove structures. The springs are interposed between the center ring and each of the first and second annular seal rings. The springs separate the first and second annular seal rings away from the center ring.

In accordance with other embodiments of the invention, the seal assembly further includes a center ring and a plurality of springs. The center ring is disposed within the annular seal housing between the first and second annular seal rings. The springs are interposed between the center ring and each of the first and second annular seal rings. The springs separate the first and second annular seal rings away from the center ring so that the gas flows around the center ring before communication onto the groove structures.

In accordance with other embodiments of the invention, the seal assembly further includes a center ring and a plurality of springs. The center ring is disposed within the annular seal housing between the first and second annular seal rings. The springs are interposed between the center ring and each of the first and second annular seal rings. The springs separate the first and second annular seal rings away from the center ring.

In accordance with other embodiments of the invention, the grooves are disposed about and communicable with an apex. The grooves are disposed diagonally with respect to rotational direction of the rotatable runner.

In accordance with other embodiments of the invention, the grooves are disposed about and communicable with an annular groove along the outer annular surface of the rotatable runner. The grooves are disposed diagonally with respect to rotational direction of the rotatable runner.

In accordance with other embodiments of the invention, the grooves are separately disposed about a central axis aligned adjacent to the first and second annular seal rings. The grooves are disposed diagonally with respect to rotational direction of the rotatable runner.

In accordance with other embodiments of the invention, the grooves are communicable with a feed groove. The feed groove directs the gas into the grooves.

In accordance with other embodiments of the invention, at least one groove structure has a secondary groove structure.

In accordance with other embodiments of the invention, the grooves vary either axially or circumferentially lengthwise.

In accordance with other embodiments of the invention, at least four grooves are separately disposed about a central axis aligned adjacent to the first and second annular seal rings. The grooves are disposed diagonally with respect to rotational direction of the rotatable runner. At least two grooves are communicable with a first feed groove and at least two other grooves are communicable with a second feed groove. The first and second feed grooves separate the gas into the respective grooves.

In accordance with other embodiments of the invention, the grooves are disposed about a central axis aligned adjacent to the first and second annular seal rings. The grooves are disposed substantially parallel with respect to rotational direction of the rotatable runner. The grooves are communicable with a feed groove. The feed groove directs the gas into the grooves.

In accordance with other embodiments of the invention, at least one groove is tapered widthwise.

In accordance with other embodiments of the invention, at least one groove has a constant width.

In accordance with other embodiments of the invention, adjacent groove structures vary widthwise.

In accordance with other embodiments of the invention, the grooves are separately disposed about a central axis aligned adjacent to the first and second annular seal rings. Adjacent groove structures vary in number of grooves.

In accordance with other embodiments of the invention, the annular seal housing includes a windback thread adjacent to the compartment including a lubricant. The windback thread directs the lubricant away from the first and second annular seal rings.

In accordance with other embodiments of the invention, a plurality of slots positioned along the rotatable runner cooperate with the windback thread to sling a lubricant away from the first and second annular seal rings.

Several exemplary advantages are mentionable. The invention facilitates a circumferential seal along a rotatable/translatable runner between a pair of low pressure compartments that minimizes mixing of a lubricant and a gas within adjacent compartments. The invention facilitates a circumferential seal along a rotatable/translatable runner between a pair of compartments that minimizes translational effects on sealing properties. The invention minimizes contamination to a paired arrangement of annular seal rings by a lubricant originating from a compartment. The invention minimizes wear along a back-to-back arrangement of sealing rings within a seal assembly.

The invention may be used within a variety of applications wherein a sealing assembly including a pair of annular seals is disposed about a translatable sealing surface between a pair of low pressure compartments. One specific non-limiting example is a turbine engine wherein a seal assembly is disposed about a rotatable/translatable runner.

The above and other objectives, features, and advantages of the preferred embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
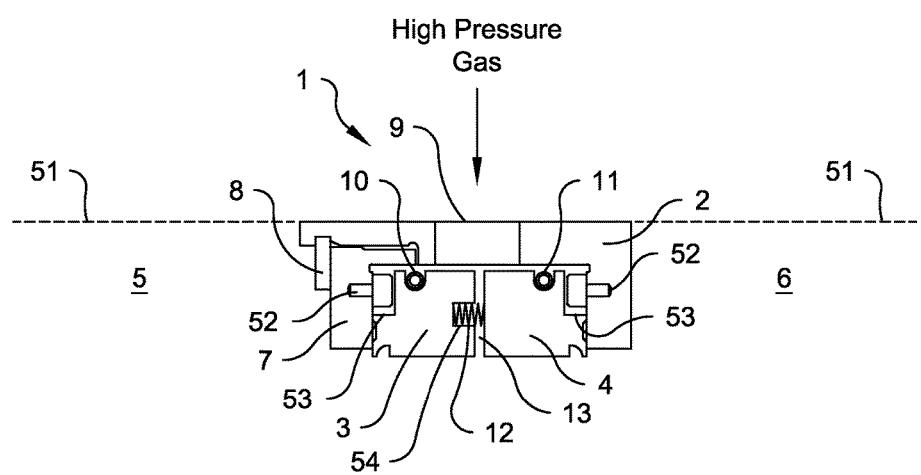
FIG. 1 is an enlarged cross section view illustrating an annular seal assembly including a pair of annular seal rings separated by a gap within a seal housing disposed about a runner attached to a shaft (cross section of annular seal assembly below centerline, runner, and shaft not shown) rotatable about a centerline within a turbine engine in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features are combinable to form other embodiments.

Referring now to FIG. 1, a seal assembly 1 is shown with an annular seal housing 2, a first annular seal ring 3, and a second annular seal ring 4, each disposed so as to be circumferentially arranged about a rotatable runner 15 (not shown). Components are composed of materials understood in the art. The rotatable runner 15 (see FIG. 2) is an element known within the art attached to a rotatable shaft. The rotatable runner 15 is rotatable within a turbine engine via the shaft. A seal is formed along the rotatable runner 15 by each annular seal ring 3, 4. The annular seal housing 2, annular seal rings 3, 4, and rotatable runner 15 are aligned along and disposed about a centerline 14, often coinciding with a rotational axis within a turbine engine. The annular seal housing 2 is attached to components comprising the housing structure 51 (generally shown) of a turbine engine fixing the annular seal housing 2 thereto. The housing structure 51 is stationary and therefore non-rotating. The housing structure 51, seal assembly 1, and the rotatable runner 15 generally define at least a first compartment 5 and a second compartment 6. The configuration of the housing structure 51 is design dependent; however, it is understood for purposes of the present invention that the housing structure 51 cooperates with the seal assembly 1 and rotatable runner 15 to define two separate compartments whereby a gas resides at a low pressure within one such compartment 5 and a lubricant resides at low pressure within another compartment 6.

The annular seal housing 2 generally defines a pocket within which the annular seal rings 3, 4 reside. The annular seal housing 2 has a U-shaped cross-section opening inward toward the centerline 14. One end of the annular seal housing 2 could include an insert 7 and a retaining ring 8 which allow for assembly/disassembly of the annular seal rings 3, 4 onto the annular seal housing 2. The annular seal rings 3, 4 could be fixed to the annular seal housing 2 via means known within the art to limit or to prevent relative rotational motion between the annular seal rings 3, 4 and the annular seal housing 2. In one non-limiting example, a pair of anti-rotation pins 52 is secured to the annular seal housing 2 to separately engage a pocket 53 along each of the first and second annular seal rings 3, 4. Interaction between the anti-rotation pin 52 and the pocket 53 functions as a positive stop to restrict rotation of each of the first and second annular seal rings 3, 4 with respect to the annular seal housing 2.

The first and second annular seal rings 3, 4 are ring-shaped elements. Each annular seal ring 3, 4 could be composed of at least two arcuate segments which form a generally circular-shaped ring when assembled about a rotatable runner 15. The segments of the first and second annular seal rings 3, 4 allow for radial expansion and contraction by the respective annular seal rings 3, 4 about a rotatable runner 15. Each annular seal ring 3, 4, is generally biased toward a rotatable runner 15 via a compressive force applied by a garter spring 10, 11. The garter spring 10, 11 could contact the outer circumference of the respective annular seal ring 3, 4 and apply a compressive force inward toward the rotatable runner 15.

A plurality of springs 12 could be separately positioned between the annular seal rings 3, 4. The springs 12 could be evenly spaced about the circumference of the annular seal rings 3, 4 so as to exert a generally uniform separation force onto the seal rings 3, 4. The springs 12 could be a coil-type device which generally resists compression. Each spring 12 could be attached or fixed to one annular seal ring 3, 4. For example, one end of each spring 12 could be partially recessed within a pocket 54 along at least one annular seal ring 3, 4. Each spring 12 should be sufficiently long so as to at least partially compress when assembled between the annular seal rings 3, 4. This arrangement ensures that each spring 12 exerts a force onto the annular seal rings 3, 4 causing the annular seal rings 3, 4 to separate, thereby pressing the annular seal rings 3, 4 onto opposite sides of the annular seal housing 2. The separation force exerted by the compression spring 12 ensures a gap 13 between the annular seal rings 3, 4.

At least one inlet 9 is disposed along an outer wall of the annular seal housing 2. The inlet(s) 9 is/are positioned so as to at least partially overlay the gap 13 between the annular seal rings 3, 4. Two or more inlets 9 could be uniformly positioned about the circumference of the annular seal housing 2. Each inlet 9 is a pathway through which a gas is communicated into and through the gap 13 between the annular seal rings 3, 4.

Figure 4:
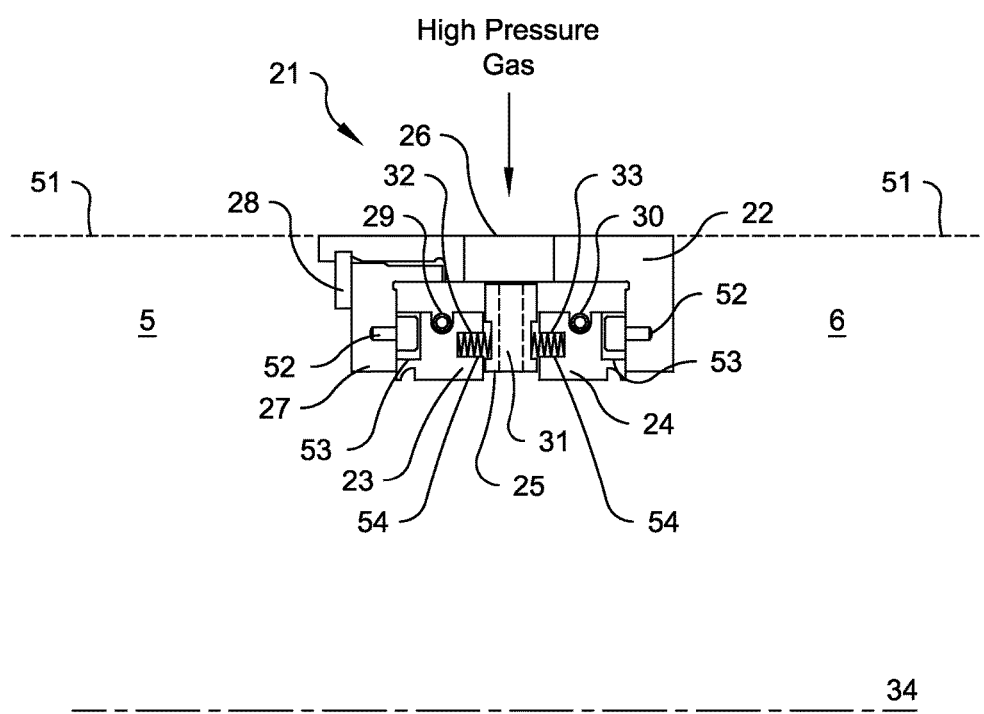
FIG. 4 is an enlarged cross section view illustrating an annular seal assembly including a pair of annular seal rings separated by a center ring within a seal housing disposed about a runner attached to a shaft (cross section of annular seal assembly below centerline, runner, and shaft not shown) rotatable about a centerline within a turbine engine in accordance with an embodiment of the invention.

Although various embodiments are described including a gap 13, it is understood that the gap 13 as described in FIG. 1 is an optional feature and that such embodiments could include a center ring 25 with optional gaps or optional holes 31 as shown in FIG. 4.

Figure 2:
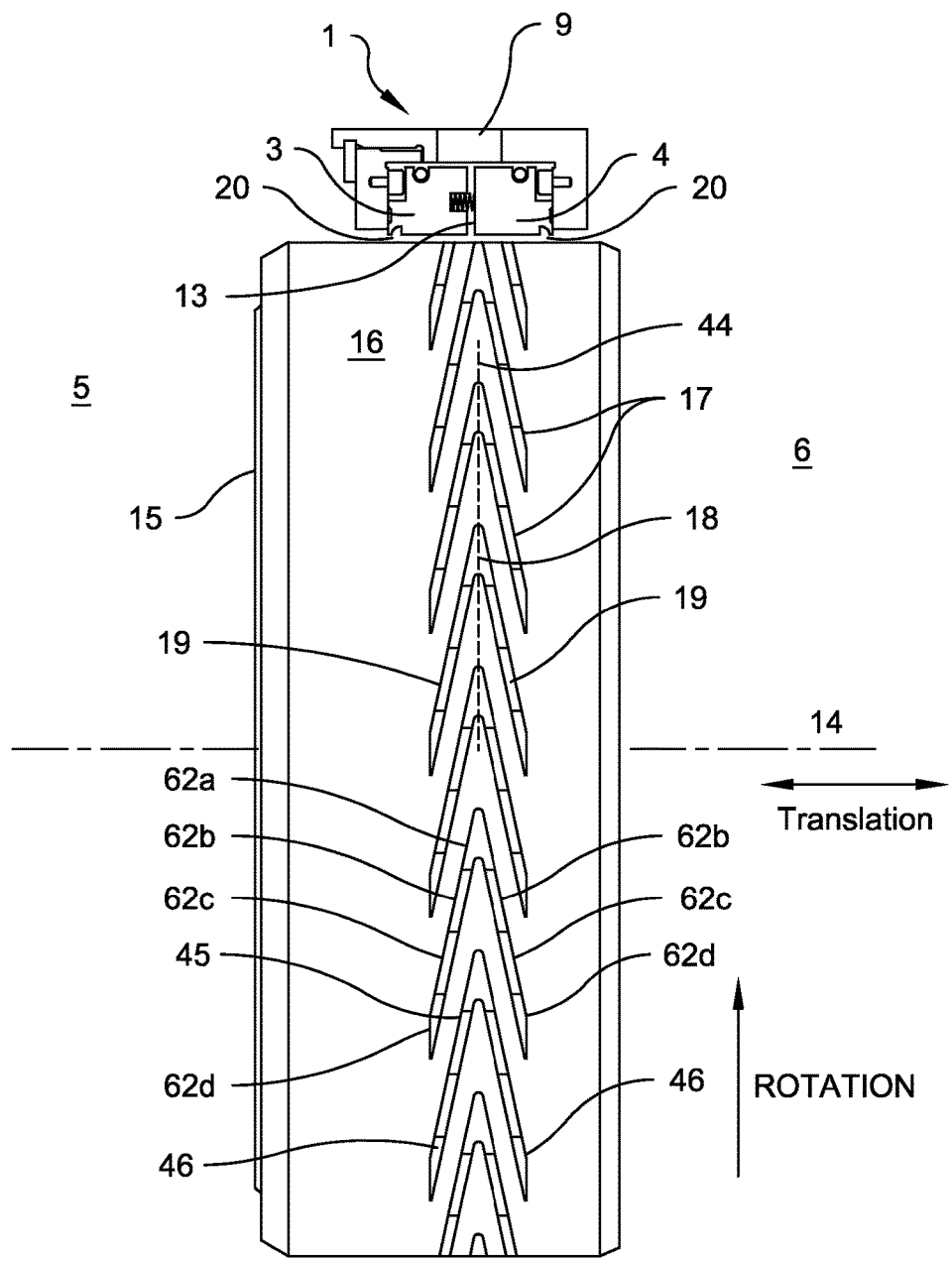
FIG. 2 is a partial cross section view illustrating an annular seal assembly including a pair of annular seal rings separated by a gap within a seal housing disposed about a rotatable runner attached to a shaft (cross section of annular seal assembly below runner and shaft not shown) wherein an outer annular surface along the runner includes a plurality of groove structures separately disposed thereon whereby each groove includes at least two steps and each groove structure communicates with both seal rings in accordance with an embodiment of the invention.

Referring now to FIG. 2, a seal assembly 1 is shown in cross-sectional form disposed about a rotatable runner 15, the latter illustrated in side-view form. The rotatable runner 15 includes a plurality of groove structures 17. The groove structures 17 are arranged circumferentially along the outer annular surface 16 of the rotatable runner 15 immediately adjacent to the seal assembly 1. The groove structures 17 are positioned so as to communicate a gas onto the annular seal rings 3, 4 as the rotatable runner 15 rotates with respect to the seal assembly 1. In some embodiments, it might be advantageous for adjacent grooves structures 17 to partially overlap as represented in FIG. 2. In other embodiments, adjacent groove structures 17 could be arranged in an end-to-end configuration or with a separation between the end of one groove structure 17 and the start of the next groove structure 17.

Each groove structure 17 further includes a pair of diagonal grooves 19 disposed about a central axis 44 circumferentially along the outer annular surface 16 of the rotatable runner 15. The diagonal grooves 19 could be aligned symmetrically or non-symmetrically about the central axis 44. Each diagonal groove 19 is a channel, depression, flute, or the like disposed along the outer annular surface 16. Although the diagonal grooves 19 are represented as linear elements, it is understood that other designs are possible including multi-linear and non-linear configurations. The central axis 44 could align with the gap 13 between the first and second annular seal rings 3, 4 or reside adjacent to the first and second annular seal rings 3, 4 to allow communication of a gas onto the groove structure 17 over the translational range of the rotatable runner 15. The diagonal grooves 19 are oriented so that the top of the left side extends toward the right and the top of the right side extends toward the left. The inward oriented ends of the diagonal grooves 19 intersect along or near the central axis 44 to form an apex 18. The apex 18 is further oriented toward the rotational direction of the rotatable runner 15 so that the diagonal grooves 19 expand outward opposite of the rotational direction. The dimensions and angular orientation of the diagonal grooves 19 and the apex 18 are design dependent and based in part on the translational range of the rotatable runner 15, the widths of the annular seal rings 3, 4 and gap 13, the extent of overlap or non-overlap between adjacent groove structures 17, the pressure required to adequately seal the interface between the rotatable runner 15 and the annular seal rings 3, 4, and/or other design factors.

Each diagonal groove 19 further includes at least two steps 62a-62d. Although four steps 62a-62d are illustrated along each diagonal groove 19 in FIG. 2, it is understood that two or more such steps 62a-62d may reside along each diagonal groove 19. Each step 62a-62d corresponds to a change in the local depth of the diagonal groove 19 relative to the outer annular surface 16. For example, if a diagonal groove 19 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 19.

When the diagonal grooves 19 intersect at an apex 18 or the like, the first step 62a may be located at the apex 18 and immediately adjacent to and communicable with the next step 62b along each diagonal groove 19 extending from the apex 18, as illustrated in FIG. 2. In other embodiments, two or more steps may reside within the apex 18 and at least one step along each diagonal groove 19. In yet other embodiments, one step 62a may reside along the apex 18 and a portion of one or more diagonal grooves 19 and the remaining step(s) 62b reside(s) exclusively along each diagonal groove 19. Regardless of the exact arrangement, the steps 62a-62d are arranged consecutively to effect a stepwise variation of the depth along the length of each groove structure 17.

In the various embodiments, the gas could originate from a combustion or mechanical source within a turbine engine. In some embodiments, the gas could be a gas heated by combustion events within an engine and communicated to the inlet(s) 9 from a compartment adjacent to the first and second compartments 5, 6. In other embodiments, the gas could be either a hot or cold gas pressurized and communicated to the outlet(s) 9 via a fan or a pump.

Referring again to FIG. 2, a gas enters the inlet(s) 9 and is directed inward across the gap 13 between the first and second annular seal rings 3, 4. After exiting the gap 13, the gas impinges the outer annular surface 16 of the rotatable runner 15, preferably at or near the apex 18 or inlet end 45. The gas enters the apex 18 or inlet end 45 and is bifurcated by the groove structure 17 so that a first portion is directed into the left-side diagonal groove 19 and a second portion is directed into the right-side diagonal groove 19. The quantity and/or rate of gas communicated onto each of the annular seal rings 3, 4 may be the same or different. The gas traverses the respective diagonal grooves 19 and is redirected outward from the rotatable runner 15 at the outlet end 46 of each diagonal groove 19. The gas exits the left-side diagonal groove 19 and impinges the first annular seal ring 3 forming a thin-film layer 20 between the first annular seal ring 3 and rotatable runner 15, thereby separating the first annular seal ring 3 from the rotatable runner 15. The gas exits the right-side diagonal groove 19 and impinges the second annular seal ring 4 forming a thin-film layer 20 between the second annular seal ring 4 and rotatable runner 15, thereby separating the second annular seal ring 4 from the rotatable runner 15.

Figure 3:
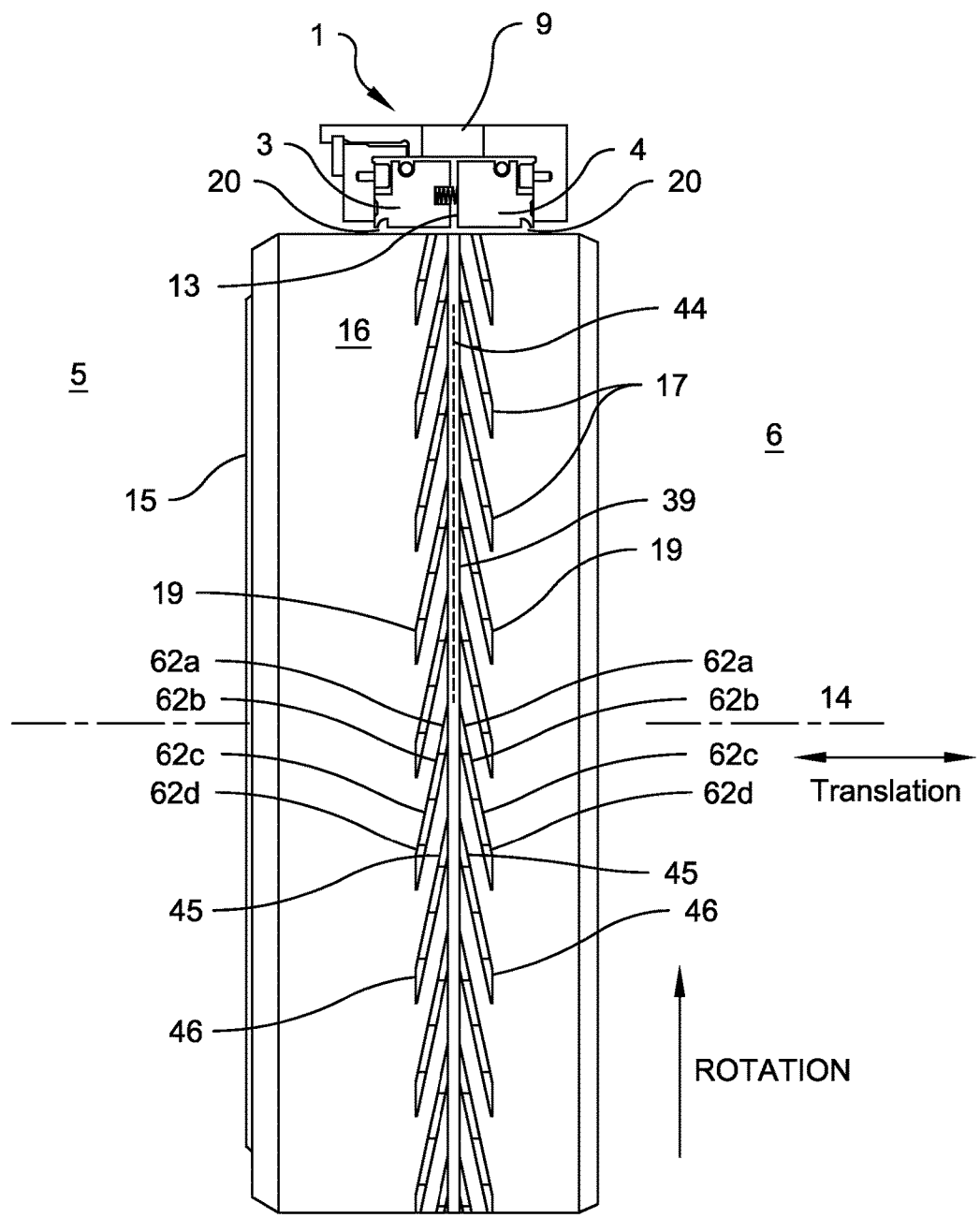
FIG. 3 is a partial cross section view illustrating an annular seal assembly including a pair of annular seal rings separated by a gap within a seal housing disposed about a rotatable runner attached to a shaft (cross section of annular seal assembly below runner and shaft not shown) wherein an outer annular surface along the runner includes a plurality of groove structures communicable with a single annular groove thereon whereby each groove includes at least two steps and each groove structure communicates with both seal rings in accordance with an embodiment of the invention.

Referring now to FIG. 3, a seal assembly 1 is shown in cross-sectional form disposed about a rotatable runner 15, the latter illustrated in side-view form, between a pair of compartments 5, 6. The rotatable runner 15 includes a plurality of groove structures 17. The groove structures 17 are arranged circumferentially along the outer annular surface 16 of the rotatable runner 15 immediately adjacent to the seal assembly 1. The groove structures 17 are positioned so as to communicate a gas onto the annular seal rings 3, 4 as the rotatable runner 15 rotates with respect to the seal assembly 1. In some embodiments, it might be advantageous for adjacent grooves structures 17 to partially overlap as represented in FIG. 3. In other embodiments, adjacent groove structures 17 could be arranged in an end-to-end configuration or with a separation between the end of one groove structure 17 and the start of the next groove structure 17.

Each groove structure 17 further includes a pair of diagonal grooves 19 disposed about a central axis 44 circumferentially along an outer annular surface 16 of the rotatable runner 15. The diagonal grooves 19 could be aligned symmetrically or non-symmetrically about the central axis 44. Each diagonal groove 19 is a channel, depression, flute, or the like disposed along the outer annular surface 16. Although the diagonal grooves 19 are represented as linear elements, it is understood that other designs are possible including multi-linear and non-linear configurations. The central axis 44 could align with the gap 13 between first and second annular seal rings 3, 4 or reside adjacent to the first and second annular seal rings 3, 4 to allow communication of a gas onto the groove structure 17 over the translational range of the rotatable runner 15. The diagonal grooves 19 are oriented so that the top of the left-side extends toward the right and the top of the right-side extends toward the left. The inward oriented ends of the diagonal grooves 19 intersect an annular groove 39 along the central axis 44. The annular groove 39 is a channel, depression, flute, or the like circumferentially along the outer annular surface 16 of the rotatable runner 15. Although the annular groove 39 is represented as linear elements, it is understood that other designs are possible including multi-linear and non-linear configurations. The intersection point between the diagonal grooves 19 and the annular groove 39 is oriented toward the rotational direction of the rotatable runner 15 so that the diagonal grooves 19 expand outward opposite of the rotational direction. The dimensions and angular orientation of the diagonal grooves 19 and annular groove 39 are design dependent and based in part on the translational range of the rotatable runner 15, the width of the annular seal rings 3, 4 and gap 13, the extent of overlap or non-overlap between adjacent groove structures 17, the pressure required to adequately seal the interface between the rotatable runner 15 and annular seal rings 3, 4, and/or other design factors.

Each diagonal groove 19 further includes at least two steps 62a-62d. Although four steps 62a-62d are illustrated along each diagonal groove 19 in FIG. 3, it is understood that two or more such steps 62a-62d may reside along each diagonal groove 19. Each step 62a-62d corresponds to a change in the local depth of the diagonal groove 19 relative to the outer annular surface 16. For example, if a diagonal groove 19 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 19.

When the diagonal grooves 19 intersect an annular groove 39 or the like, the first step 62a is immediately adjacent to and communicable with the annular groove 39 as illustrated in FIG. 3. The depth of the first step 62a may be deeper than, shallower than, or the same as the depth of the annular groove 39. Regardless of the exact arrangement, the steps 62a-62d are arranged consecutively to effect a stepwise variation of the depth along the length of each groove structure 17.

Referring again to FIG. 3, a gas enters the inlet(s) 9 and is directed inward across the gap 13 between the first and second annular seal rings 3, 4. After exiting the gap 13, the gas impinges the outer annular surface 16 of the rotatable runner 15, preferably at or near the annular groove 39. The gas enters the annular groove 39 and is bifurcated by the groove structure 17 so that a first portion is directed into the inlet end 45 of the left-side diagonal groove 19 and a second portion is directed into the inlet end 45 of the right-side diagonal groove 19. The quantity and/or rate of gas communicated onto each of the annular seal rings 3, 4 may be the same or different. The continuity of the annular groove 39 allows for uninterrupted communication of the gas into the diagonal grooves 19. The gas traverses the respective diagonal grooves 19 and is redirected outward from the rotatable runner 15 at the outlet end 46 of each diagonal groove 19. The gas exits the left-side diagonal groove 19 and impinges the first annular seal ring 3 forming a thin-film layer 20 between the first annular seal ring 3 and rotatable runner 15, thereby separating the first annular seal ring 3 from the rotatable runner 15. The gas exits the right-side diagonal groove 19 and impinges the second annular seal ring 4 forming a thin-film layer 20 between the second annular seal ring 4 and rotatable runner 15, thereby separating the second annular seal ring 4 from the rotatable runner 15.

Figure 5:
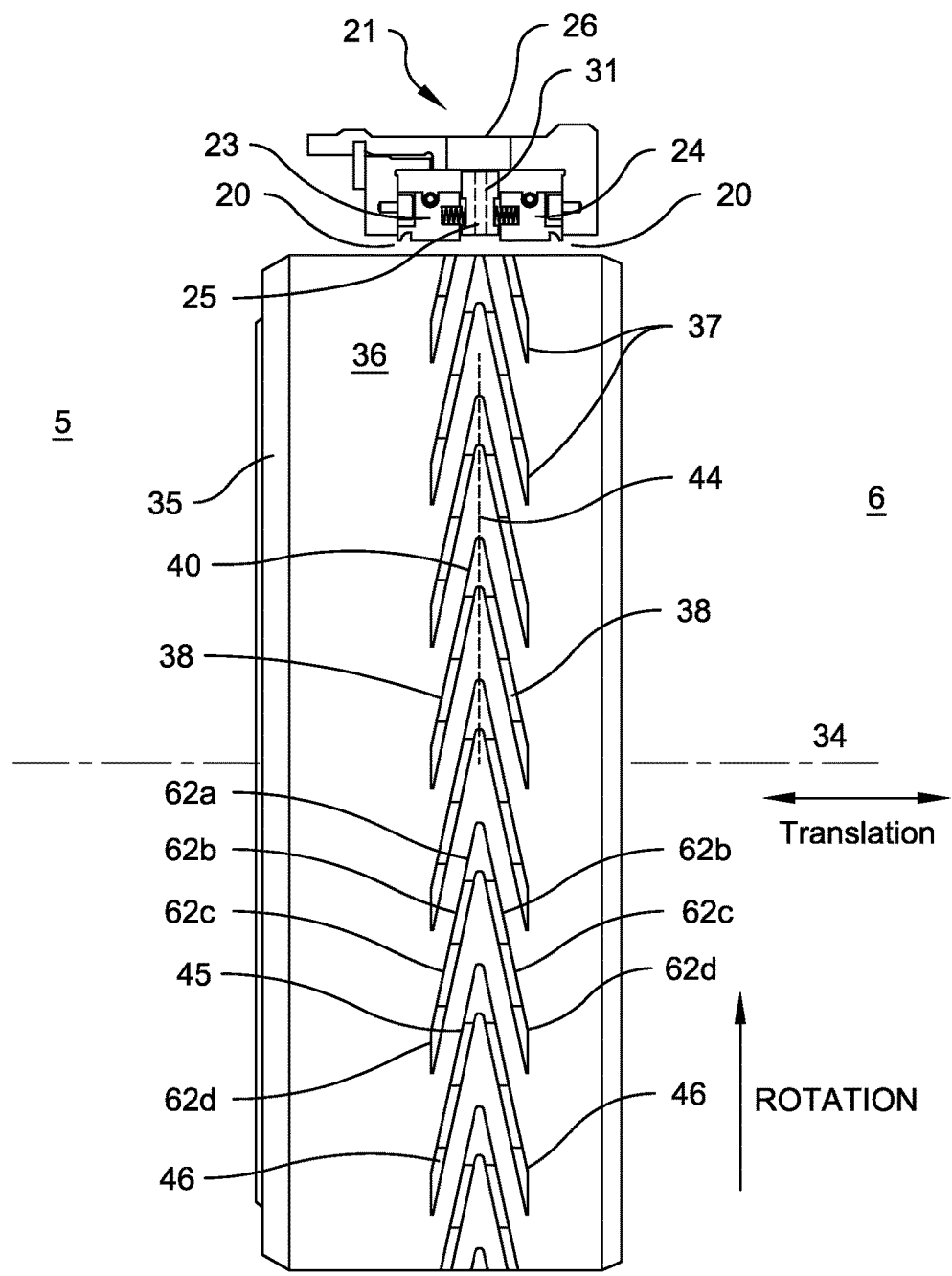
FIG. 5 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of groove structures separately disposed thereon whereby each groove includes at least two steps and each groove structure communicates with both seal rings in accordance with an embodiment of the invention.

Referring now to FIG. 4, a seal assembly 21 is shown with an annular seal housing 22, a first annular seal ring 23, a second annular seal ring 24, and a center ring 25, each disposed so as to be circumferentially arranged about a rotatable runner 35 (see FIG. 5). Components are composed of materials understood in the art. The rotatable runner 35 is an element known within the art attached to a rotatable shaft (not shown). The rotatable runner 35 is rotatable within the turbine engine via the shaft. A seal is formed along the rotatable runner 35 by each annular seal ring 23, 24. The annular seal housing 22, annular seal rings 23, 24, center ring 25, and rotatable runner 35 are aligned along and disposed about a centerline 34, often coinciding with a rotational axis along a turbine engine. The annular seal housing 22 is attached to components comprising the housing structure 51 (generally shown) of a turbine engine fixing the annular seal housing 22 thereto. The housing structure 51 is stationary and therefore non-rotating. The housing structure 51, seal assembly 21, and the rotatable runner 35 generally define at least a first compartment 5 and a second compartment 6. The configuration of the housing structure 51 is design dependent; however, it is understood for purposes of the present invention that the housing structure 51 cooperates with the seal assembly 1 and rotatable runner 35 to define two separate compartments whereby a gas resides at a low pressure within one such compartment 5 and a lubricant resides at low pressure within another compartment 6.

The annular seal housing 22 generally defines a pocket within which the annular seal rings 23, 24 and center ring 25 reside. The annular seal housing 22 could have a U-shaped cross-section opening inward toward the centerline 34. One end of the annular seal housing 22 could include an insert 27 and a retaining ring 28 which allow for assembly/disassembly of the annular seal rings 23, 24 and center ring 25 onto the annular seal housing 22. The annular seal rings 23, 24 could be fixed to the annular seal housing 22 via means known within the art to limit or to prevent relative rotational motion between the annular seal rings 23, 24 and the annular seal housing 22. In one non-limiting example, a pair of anti-rotation pins 52 is secured to the annular seal housing 22 to separately engage a pocket 53 along each of the first and second annular seal rings 23, 24. Interaction between anti-rotation pin 52 and pocket 53 functions as a positive stop to restrict rotation of each of the first and second annular seal rings 23, 24 with respect to the annular seal housing 22.

The first and second annular seal rings 23, 24 are ring-shaped elements. Each annular seal ring 23, 24 could comprise at least two arcuate segments which form a generally circular-shaped ring when assembled about a rotatable runner 35. The segmented construction of the first and second annular seal rings 3, 4 allows for radial expansion and contraction by the respective annular seal rings 23, 24 about a rotatable runner 35. Each annular seal ring 23, 24, is generally biased toward a rotatable runner 35 via a compressive force applied by a garter spring 29, 30. The garter spring 29, 30 could contact the outer circumference of the respective annular seal ring 23, 24 and apply the compressive force inward toward the rotatable runner 35.

The center ring 25 is interposed between the first and second annular seal rings 23, 24 within the annular seal housing 22. A plurality of first springs 32 are interposed between the first annular seal ring 23 and the center ring 25. A plurality of second springs 33 are interposed between the second annular seal ring 24 and the center ring 25. The first and second springs 32, 33 could be evenly spaced about the circumference of the respective annular seal rings 23, 24 so as to exert a generally uniform separation force onto each annular seal ring 23, 24 with respect to the center ring 25. The first and second springs 32, 33 could be a coil-type device which generally resists compression. Each spring 32, 33 could be attached or fixed to the respective annular seal ring 23, 24. For example, one end of each first and second spring 32, 33 could be partially recessed within a pocket 54 along the respective annular seal ring 23, 24. First and second springs 32, 33 should be sufficiently long so as to at least partially compress when assembled between the respective annular seal rings 23, 24 and center ring 25. First and second springs 32, 33 should exert a force onto the annular seal rings 23, 24 causing the annular seal rings 23, 24 to separate from the center ring 25, thereby pressing the annular seal rings 23, 24 onto opposite sides of the annular seal housing 22 with the center ring 25 substantially centered between the annular seal rings 23, 24. The separation force exerted by the compression springs 32, 33 could form an optional gap (not shown) between the center ring 25 and each annular seal ring 23, 24.

At least one inlet 26 is disposed along an outer wall of the annular seal housing 22. The inlet(s) 26 is/are positioned so as to at least partially overlay the center ring 25 between the annular seal rings 23, 24. Two or more inlets 26 could be uniformly positioned about the circumference of the annular seal housing 22. Each inlet 26 is a pathway through which a gas is communicated between the annular seal rings 23, 24.

In some embodiments, the center ring 25 could include a plurality of holes 31 traversing the radial dimension of the center ring 25. The holes 31 could be evenly spaced about the circumference of the center ring 25 and positioned so as to at least partially overlay the inlet(s) 26.

Although various embodiments are described including a center ring 25, it is understood that the center ring 25 is an optional feature and that such embodiments could include the gap 13 arrangement shown in FIG. 1.

Referring now to FIG. 5, a seal assembly 21 is shown in cross-sectional form disposed about a rotatable runner 35, the latter illustrated in side-view form, between a pair of compartments 5, 6. The rotatable runner 35 includes a plurality of groove structures 37. The groove structures 37 are arranged circumferentially along the outer annular surface 36 of the rotatable runner 35 immediately adjacent to the seal assembly 21. The groove structures 37 are positioned so as to communicate a gas onto the annular seal rings 23, 24 as the rotatable runner 35 rotates with respect to the seal assembly 21. In some embodiments, it might be advantageous for adjacent grooves structures 37 to partially overlap as represented in FIG. 5. In other embodiments, adjacent groove structures 37 could be arranged in an end-to-end configuration or with a separation between the end of one groove structure 37 and the start of the next groove structure 37.

Each groove structure 37 further includes a pair of diagonal grooves 38 disposed about a central axis 44 circumferentially along an outer annular surface 36 of the rotatable runner 35. The diagonal grooves 38 could be aligned symmetrically or non-symmetrically about the central axis 44. Each diagonal groove 38 is a channel, depression, flute, or the like disposed along the outer annular surface 36. Although the diagonal grooves 38 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 37 over the translational range of the rotatable runner 35. The diagonal grooves 38 are oriented so that the top of the left-side diagonal groove 38 extends toward the right and the top of the right-side diagonal groove 38 extends toward the left. The inward oriented ends of the diagonal grooves 38 intersect along or near the central axis 44 to form an apex 40. The apex 40 is further oriented toward the rotational direction of the rotatable runner 35 so that the diagonal grooves 38 expand outward opposite of the rotational direction. The dimensions and angular orientation of the diagonal grooves 38 and the apex 40 are design dependent and based in part on the translational range of the rotatable runner 35, the widths of the annular seal rings 23, 24, center ring 25 and optional hole 31, the extent of overlap or non-overlap between adjacent groove structures 37, the pressure required to adequately seal the interface between the rotatable runner 35 and annular seal rings 23, 24, and/or other design factors.

Each diagonal groove 38 further includes at least two steps 62a-62d. Although four steps 62a-62d are illustrated along each diagonal groove 38 in FIG. 5, it is understood that two or more such steps 62a-62d may reside along each diagonal groove 38. Each step 62a-62d corresponds to a change in the local depth of the diagonal groove 38 relative to the outer annular surface 36. For example, if a diagonal groove 38 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 38.

When the diagonal grooves 38 intersect at an apex 40 or the like, the first step 62a may be located at the apex 40 and immediately adjacent to and communicable with the next step 62b along each diagonal groove 38 extending from the apex 40, as illustrated in FIG. 5. In other embodiments, two or more steps may reside within the apex 40 and at least one step along each diagonal groove 38. In yet other embodiments, one step 62a may reside along the apex 40 and a portion of one or more diagonal grooves 38 and the remaining step(s) 62b reside(s) exclusively along each diagonal groove 38. Regardless of the exact arrangement, the steps 62a-62d are arranged consecutively to effect a stepwise variation of the depth along the length of each groove structure 37.

Referring again to FIG. 5, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the outer annular surface 36 of the rotatable runner 35, preferably at or near the apex 40 or inlet end 45. The gas enters the apex 40 or inlet end 45 and is bifurcated by the groove structure 37 so that a first portion is directed into the left-side diagonal groove 38 and a second portion is directed into the right-side diagonal groove 38. The quantity and/or rate of gas communicated onto each of the annular seal rings 23, 24 may be the same or different. The gas traverses the respective diagonal grooves 38 and is redirected outward from the rotatable runner 35 at the outlet end 46 of each diagonal groove 38. The gas exits the left-side diagonal groove 38 and impinges the first annular seal ring 23 forming a thin-film layer 20 between the first annular seal ring 23 and rotatable runner 35, thereby separating the first annular seal ring 23 from the rotatable runner 35. The gas exits the right-side diagonal groove 38 and impinges the second annular seal ring 24 forming a thin-film layer 20 between the second annular seal ring 24 and rotatable runner 35, thereby separating the second annular seal ring 24 from the rotatable runner 35.

Figure 6:
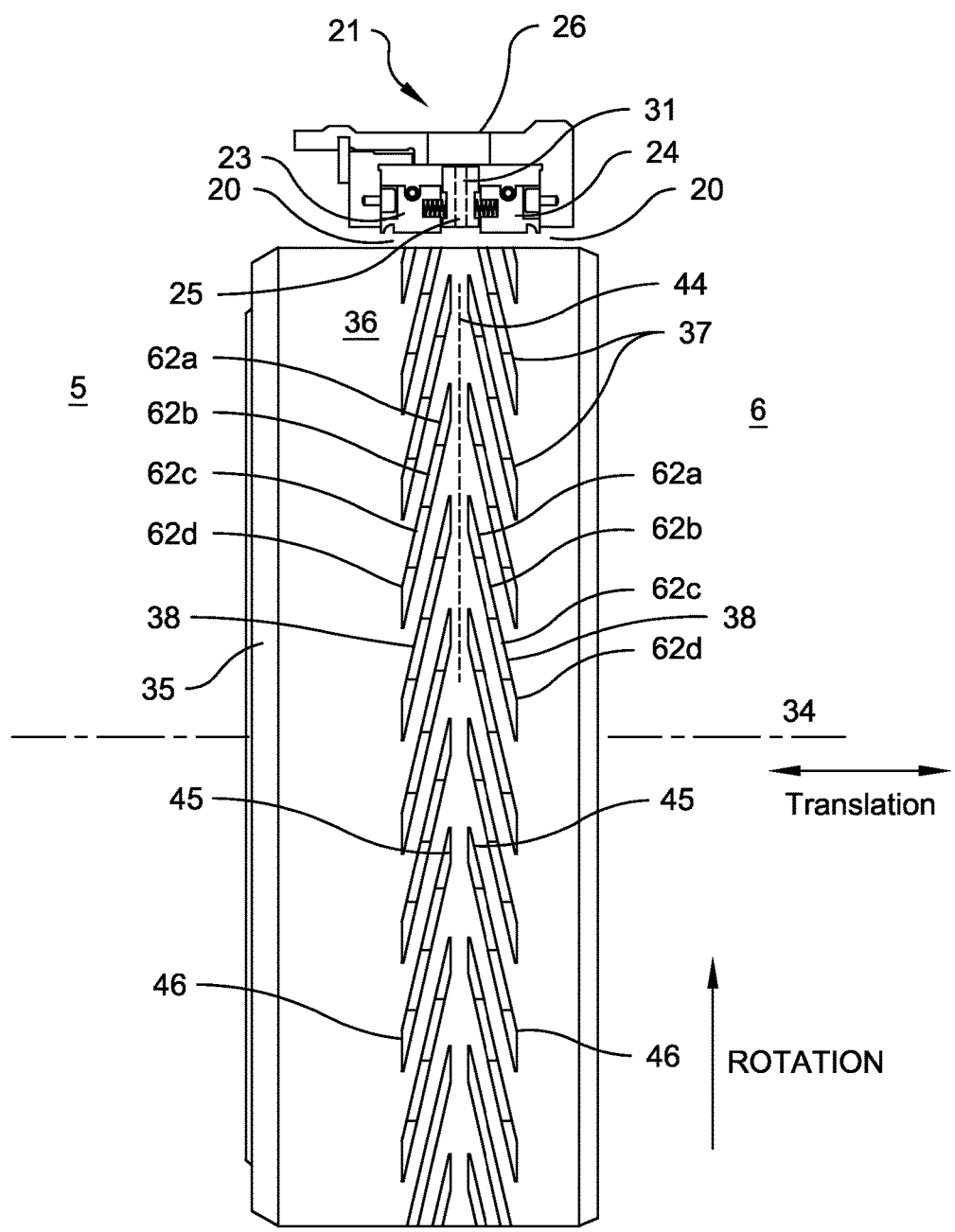
FIG. 6 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated groove structures separately disposed thereon whereby each groove includes at least two steps and each pair of non-intersecting groove structures communicates with both seal rings in accordance with an embodiment of the invention.

Referring now to FIG. 6, a seal assembly 21 is shown in cross-sectional form disposed about a rotatable runner 35, the latter illustrated in side-view form, between a pair of compartments 5, 6. The rotatable runner 35 includes a plurality of groove structures 37. The groove structures 37 are arranged circumferentially along the outer annular surface 36 of the rotatable runner 35 immediately adjacent to the seal assembly 21. The groove structures 37 are positioned so as to communicate a gas onto the annular seal rings 23, 24 as the rotatable runner 35 rotates with respect to the seal assembly 21. In some embodiments, it might be advantageous for adjacent grooves structures 37 to partially overlap as represented in FIG. 6. In other embodiments, adjacent groove structures 37 could be arranged in an end-to-end configuration or with a separation between the end of one groove structure 37 and the start of the next groove structure 37.

Each groove structure 37 further includes a pair of diagonal grooves 38 disposed about a central axis 44 circumferentially along an outer annular surface 36 of the rotatable runner 35. The diagonal grooves 38 could be aligned symmetrically or non-symmetrically about the central axis 44. Each diagonal groove 38 is a channel, depression, flute, or the like disposed along the outer annular surface 36. Although the diagonal grooves 38 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 37 over the translational range of the rotatable runner 35. The diagonal grooves 38 are oriented so that the top of the left-side diagonal groove 38 extends toward the right and the top of the right-side diagonal groove 38 extends toward the left. The inward oriented ends of the diagonal grooves 38 are separately disposed about the central axis 44 so that the diagonal grooves 38 expand outward opposite of the rotational direction. The dimensions and angular orientation of the diagonal grooves 38 are design dependent and based in part on the translational range of the rotatable runner 35, the widths of the annular seal rings 23, 24, center ring 25 and optional hole 31, the extent of overlap or non-overlap between adjacent groove structures 37, the pressure required to adequately seal the interface between the rotatable runner 35 and annular seal rings 23, 24, and/or other design factors.

Each diagonal groove 38 further includes at least two steps 62a-62d. Although four steps 62a-62d are illustrated along each diagonal groove 38 in FIG. 6, it is understood that two or more such steps 62a-62d may reside along each diagonal groove 38. Each step 62a-62d corresponds to a change in the local depth of the diagonal groove 38 relative to the outer annular surface 36. For example, if a diagonal groove 38 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 38. Regardless of the exact arrangement, the steps 62a-62d are arranged consecutively to effect a stepwise variation of the depth along the length of each groove structure 37.

Referring again to FIG. 6, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the outer annular surface 36 of the rotatable runner 35, preferably at or near inlet ends 45. The gas is bifurcated by the groove structure 37 at the inlet ends 45 so that a first portion is directed into the left-side diagonal groove 38 and a second portion is directed into the right-side diagonal groove 38. The quantity and/or rate of gas communicated onto each of the annular seal rings 23, 24 may be the same or different. The gas traverses the respective diagonal grooves 38 and is redirected outward from the rotatable runner 35 at the outlet end 46 of each diagonal groove 38. The gas exits the left-side diagonal groove 38 and impinges the first annular seal ring 23 forming a thin-film layer 20 between the first annular seal ring 23 and rotatable runner 35, thereby separating the first annular seal ring 23 from the rotatable runner 35. The gas exits the right-side diagonal groove 38 and impinges the second annular seal ring 24 forming a thin-film layer 20 between the second annular seal ring 24 and rotatable runner 35, thereby separating the second annular seal ring 24 from the rotatable runner 35.

Figure 7:
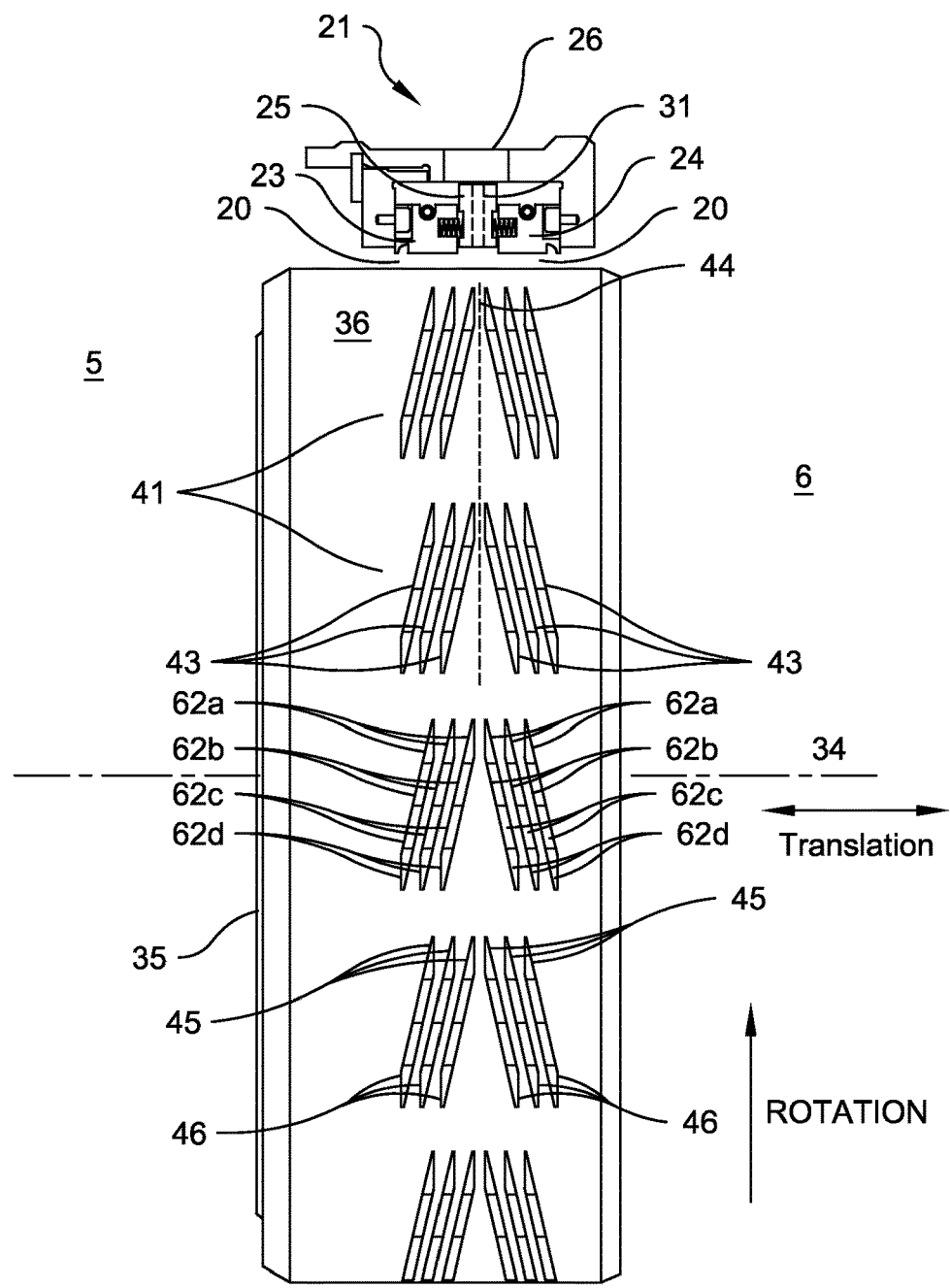
FIG. 7 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated multi-groove structures separately disposed thereon whereby each groove includes at least two steps and each pair of non-intersecting multi-groove structures communicates with both seal rings in accordance with an embodiment of the invention.

Referring now to FIG. 7, a seal assembly 21 is shown in cross-sectional form disposed about a rotatable runner 35, the latter illustrated in side-view form, between a pair of compartments 5, 6. The rotatable runner 35 includes a plurality of groove structures 41. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIG. 7.

Each groove structure 41 further includes a plurality of diagonal grooves 43 disposed about a central axis 44 circumferentially along an outer annular surface 36 of the rotatable runner 35. The diagonal grooves 43 could be aligned symmetrically or non-symmetrically about the central axis 44. Each diagonal groove 43 is a channel, depression, flute, or the like disposed along the outer annular surface 36. Although the diagonal grooves 43 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 41 over the translational range of the rotatable runner 35. The diagonal grooves 43 are oriented so that the top of each left-side diagonal groove 43 extends toward the right and the top of each right-side diagonal groove 43 extends toward the left. The inward oriented ends of the diagonal grooves 43 are separately disposed about the central axis 44 so that the diagonal grooves 43 expand outward opposite of the rotational direction.

At least two diagonal grooves 43 are disposed along each side of the central axis 44. In some embodiments, the diagonal grooves 43 could be substantially parallel to other diagonal grooves 43 along the same side of the central axis 44 as represented by the set of three diagonal grooves 43 along each side of the central axis 44 in FIG. 7. In other embodiments, the diagonal grooves 43 could be oriented at two or more angles with respect to the rotational direction and/or central axis 44 whereby the diagonal grooves 43 along the same side of the central axis 44 are non-parallel. It is also possible in some embodiments for the inlet ends 45 and the outlet ends 46 to be aligned circumferentially as represented in FIG. 7. In yet other embodiments, the inlet ends 45 and the outlet ends 46 could be skewed or staggered and/or the diagonal grooves 43 have the same or different lengths.

The dimensions, angular orientation and number of the diagonal grooves 43 are design dependent and based in part on the translational range of the rotatable runner 35, the widths of the annular seal rings 23, 24, center ring 25 and optional hole 31, the extent of overlap or non-overlap between adjacent groove structures 41, the number of flows from a groove structure 41 required to impinge each annular seal ring 23, 24, the pressure required to adequately seal the interface between the rotatable runner 35 and annular seal rings 23, 24, and/or other design factors.

Each diagonal groove 43 further includes at least two steps 62a-62d. Although four steps 62a-62d are illustrated along each diagonal groove 43 in FIG. 7, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43. Regardless of the exact arrangement, the steps 62a-62d are arranged consecutively to effect a stepwise variation of the depth along the length of each groove structure 41.

Referring again to FIG. 7, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the outer annular surface 36 of the rotatable runner 35, preferably at or near inlet ends 45. The gas is bifurcated by the groove structure 41 at the inlet ends 45 so that a first portion is directed into the left-side diagonal grooves 43 and a second portion is directed into the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The gas exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35.

Figure 8:
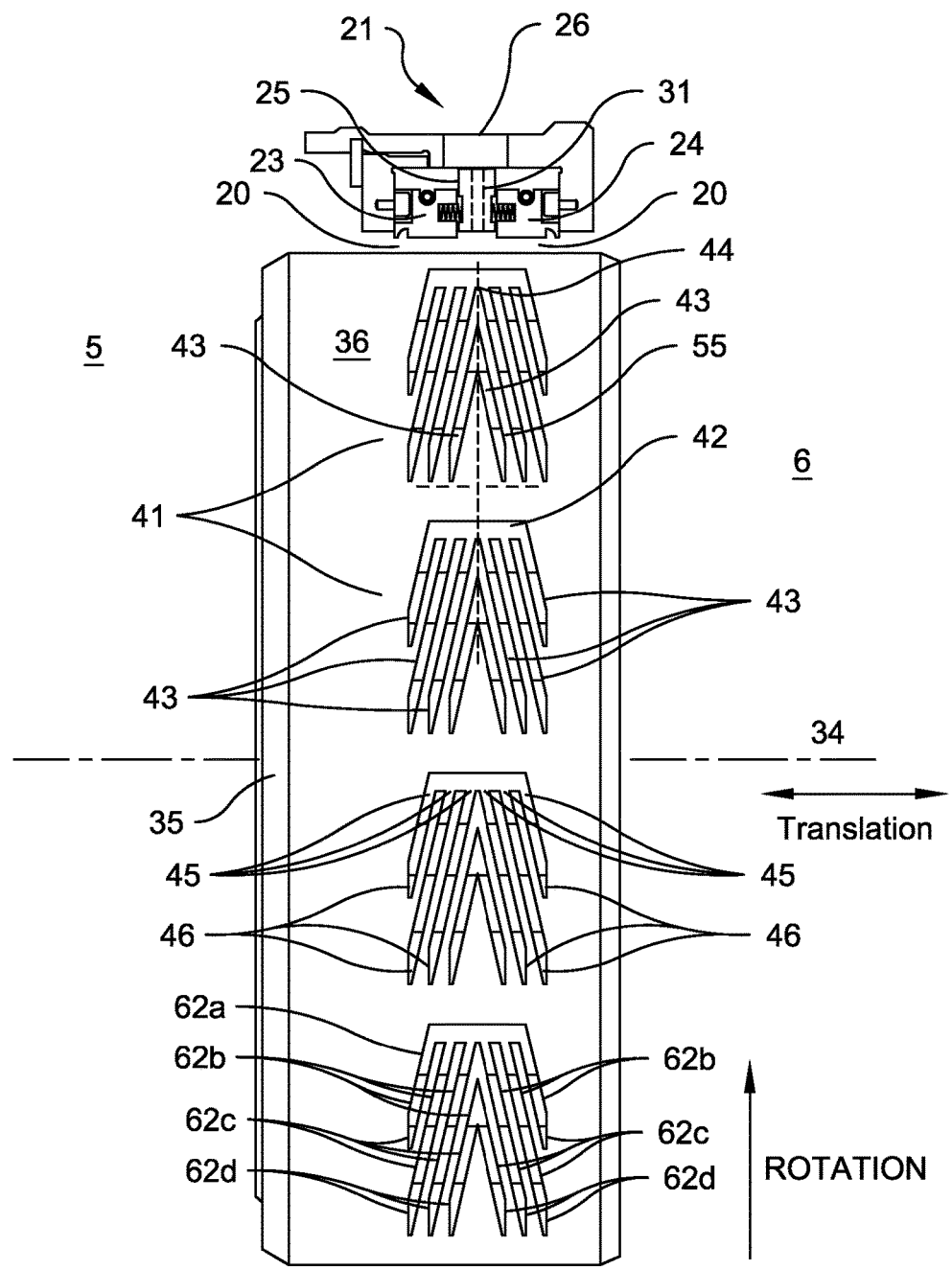
FIG. 8 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of multi-groove structures separately disposed thereon whereby each groove includes at least two steps and each multi-groove structure communicates with both seal rings in accordance with an embodiment of the invention.

Referring now to FIG. 8, a seal assembly 21 is shown in cross-sectional form disposed about a rotatable runner 35, the latter illustrated in side-view form, between a pair of compartments 5, 6. The rotatable runner 35 includes a plurality of groove structures 41. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIG. 8.

Each groove structure 41 further includes at least two of diagonal grooves 43 disposed about a central axis 44 circumferentially along an outer annular surface 36 of the rotatable runner 35. The diagonal grooves 43 could be aligned symmetrically or non-symmetrically about the central axis 44. Each diagonal groove 43 is a channel, depression, flute, or the like disposed along the outer annular surface 36. Although the diagonal grooves 43 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 41 over the translational range of the rotatable runner 35. The diagonal grooves 43 are oriented so that the top of each left-side diagonal groove 43 extends toward the right and the top of each right-side diagonal groove 43 extends toward the left. The inward oriented ends of the diagonal grooves 43 are separately disposed about the central axis 44 so that the diagonal grooves 43 expand outward opposite of the rotational direction.

At least one diagonal groove 43 is disposed along each side of the central axis 44. When two or more diagonal grooves 43 are disposed along each side of the central axis 44, the diagonal grooves 43 could be substantially parallel to other diagonal grooves 43 along the same side of the central axis 44 as represented by the set of three diagonal grooves 43 along each side of the central axis 44 in FIG. 8. In other embodiments, the diagonal grooves 43 could be oriented at two or more angles with respect to the rotational direction and/or central axis 44 whereby the diagonal grooves 43 along the same side of the central axis 44 are non-parallel. Two or more of the inlet ends 45 and the outlet ends 46 could be aligned circumferentially as represented in FIG. 8. Two or more of other inlet ends 45 and outlet ends 46 could be skewed or staggered as also represented in FIG. 8. Two or more diagonal grooves 43 could have the same or different lengths as further represented in FIG. 8.

Two or more diagonal grooves 43 could communicate with a feed groove 42 at the inlet ends 45 of the diagonal grooves 43. The feed groove 42 is a channel, depression, flute, or the like disposed along the outer annular surface 36. Although the feed groove 42 is represented as a linear element, it is understood that other designs are possible including multi-linear and non-linear configurations. The feed groove 42 is generally oriented to traverse the central axis 44 so as to communication with diagonal grooves 43 along both sides of the groove structure 41. The feed groove 42 could be substantially perpendicular to the rotational direction of the rotatable runner 35 and/or the central axis 44 as represented in FIG. 8. In other embodiments the feed groove 42 could be obliquely oriented with respect to the rotational direction and/or central axis 44. When less than all diagonal grooves 43 communicate with a feed groove 42 it is possible for the diagonal grooves 43 to intersect as described in FIGS. 2 and 5 to form a secondary groove structure 55 within the larger primary groove structure 41, as represented in FIG. 8.

The dimensions, angular orientation and number of the diagonal grooves 43 and feed groove 42 are design dependent and based in part on the translational range of the rotatable runner 35, the widths of the annular seal rings 23, 24, center ring 25 and optional hole 31, the extent of overlap or non-overlap between adjacent groove structures 41 with or without secondary groove structures 55, the number of flows from a groove structure 41 required to impinge each annular seal ring 23, 24, the pressure required to adequately seal the interface between the rotatable runner 35 and annular seal rings 23, 24, and/or other design factors.

Each diagonal groove 43 further includes at least two steps 62a-62d. Although three or four steps 62a-62d are illustrated along the diagonal grooves 43 in FIG. 8, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43.

When the diagonal grooves 43 intersect at an apex as otherwise described herein or a feed groove 40, the first step 62a may be located at the apex or the feed groove 40 and immediately adjacent to and communicable with the next step 62b along each diagonal groove 43, as illustrated in FIG. 8. In other embodiments, two or more steps may reside within the apex or the feed groove 40 and at least one step along each diagonal groove 43. In yet other embodiments, one step 62a may reside along the apex or the feed groove 40 and a portion of one or more diagonal grooves 43 and the remaining step(s) 62b reside(s) exclusively along each diagonal groove 43, as also illustrated in FIG. 8. Regardless of the exact arrangement, the steps 62a-62d are arranged consecutively to effect a stepwise variation of the depth along the length of each groove structure 41 and each secondary groove structure 55.

Referring again to FIG. 8, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges the feed groove 42 along the outer annular surface 36 of the rotatable runner 35. The gas is bifurcated along the feed groove 42 allowing the gas to enter the inlet ends 45 so that a first portion is directed into the left-side diagonal grooves 43 and a second portion is directed into the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The gas exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35. The flow characteristics of the secondary groove structure 55 are as described for FIGS. 2 and 5.

Figure 9:
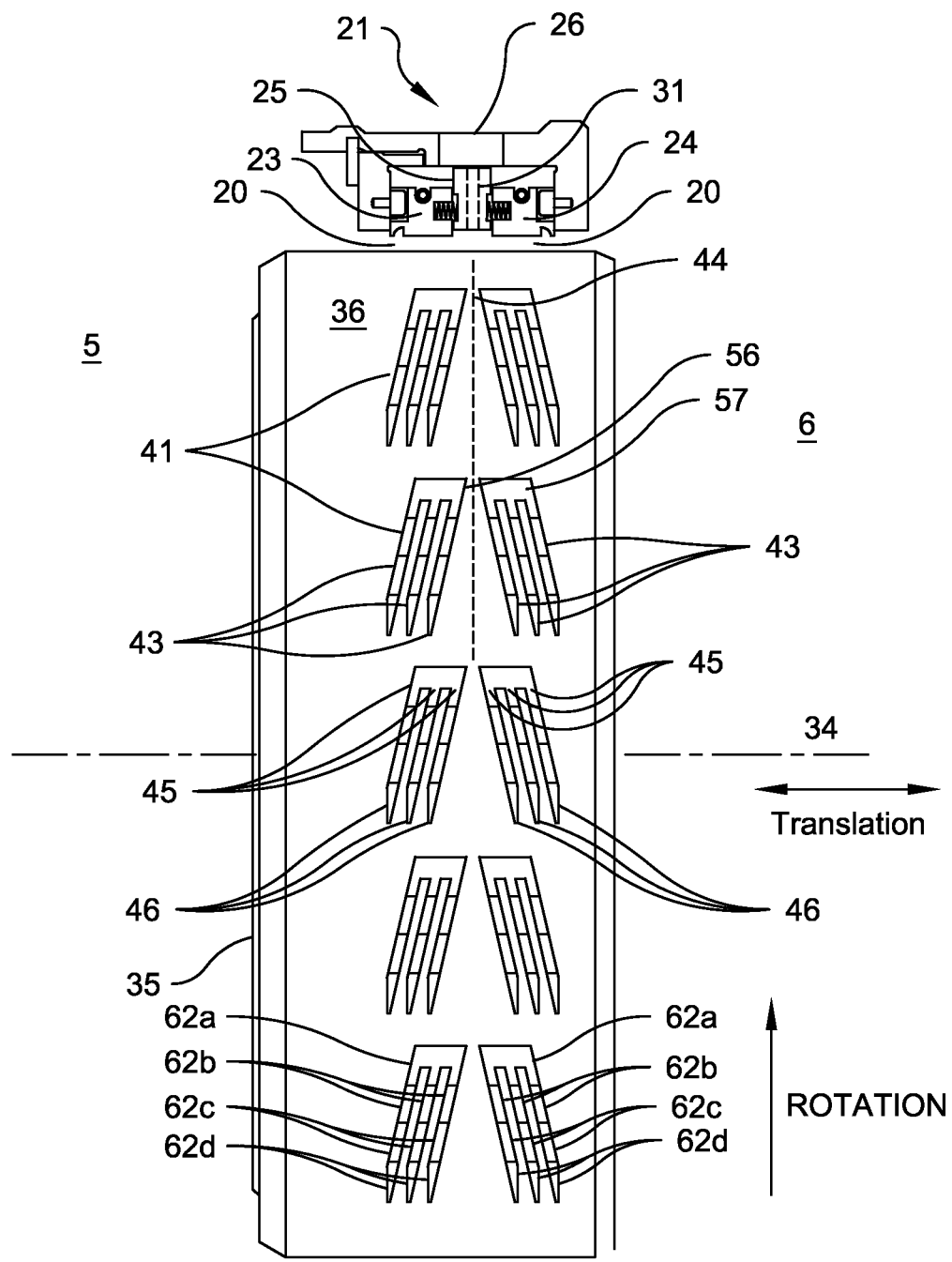
FIG. 9 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated multi-groove structures separately disposed thereon whereby the multi-grooves form two separate substructures within each multi-groove structure, each groove includes at least two steps, and each multi-groove structure communicates with both seal rings in accordance with an embodiment of the invention.
Figure 10:
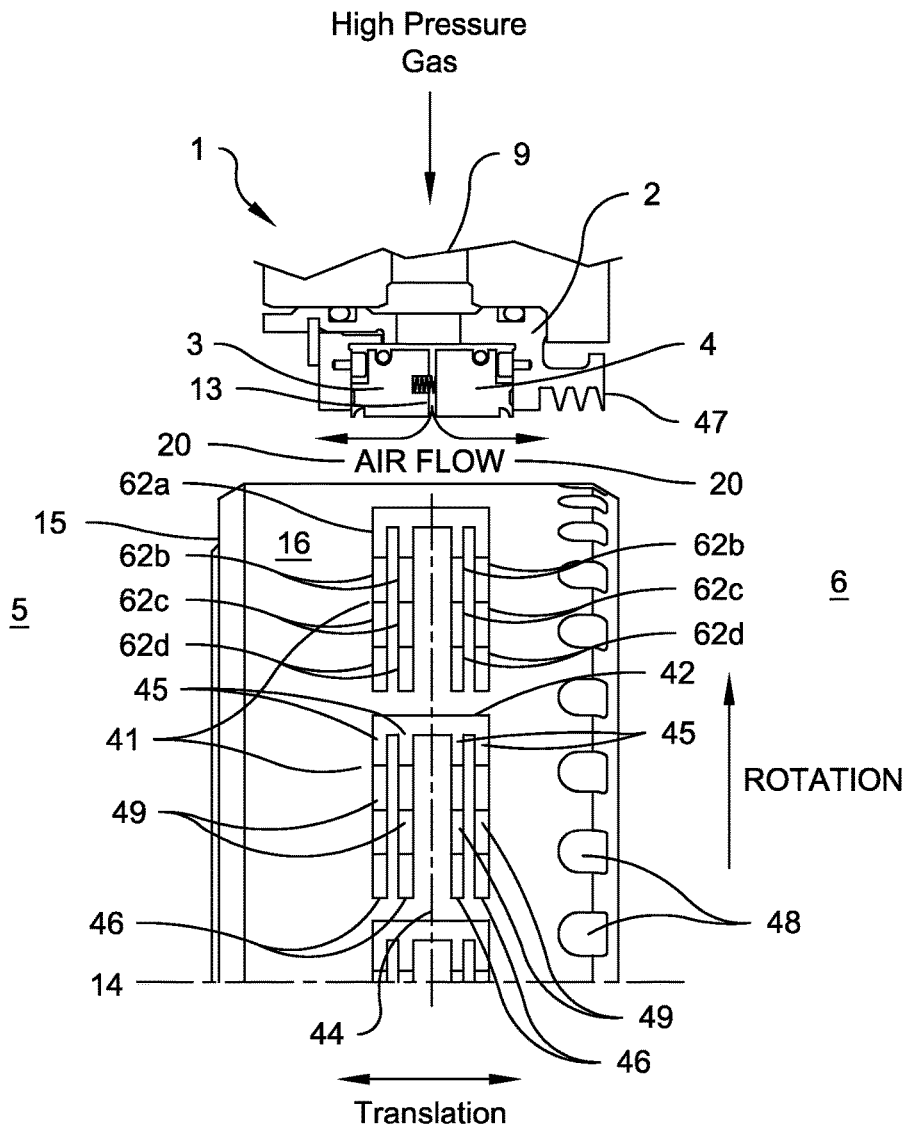
FIG. 10 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) and optional slots positioned along one end of the rotatable runner adjacent to the windback thread wherein an outer annular surface along the runner includes a plurality of multi-groove structures separately disposed thereon whereby each groove includes at least two steps and each multi-groove structure communicates with both seal rings in accordance with an embodiment of the invention.

Referring now to FIG. 9, a seal assembly 21 is shown in cross-sectional form disposed about a rotatable runner 35, the latter illustrated in side-view form, between a pair of compartments 5, 6. The rotatable runner 35 includes a plurality of groove structures 41. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIG. 9.

Each groove structure 41 further includes at least two diagonal grooves 43 disposed about a central axis 44 circumferentially along an outer annular surface 36 of the rotatable runner 35. The diagonal grooves 43 could be aligned symmetrically or non-symmetrically about the central axis 44. Each diagonal groove 43 is a channel, depression, flute, or the like disposed along the outer annular surface 36. Although the diagonal grooves 43 are represented as linear elements, it is understood that other designs are possible including multi-linear and non-linear configurations. The central axis 44 could align with the center ring 25 between first and second annular seal rings 23, 24 or reside adjacent to the first and second annular seal rings 23, 24 to allow communication of a gas onto the groove structures 41 over the translational range of the rotatable runner 35. The diagonal grooves 43 are oriented so that the top of each left-side diagonal groove 43 extends toward the right and the top of each right-side diagonal groove 43 extends toward the left. The inward oriented ends of the diagonal grooves 43 are separately disposed about the central axis 44 so that the diagonal grooves 43 expand outward opposite of the rotational direction.

At least two diagonal grooves 43 are disposed along each side of the central axis 44. The diagonal grooves 43 could be substantially parallel to other diagonal grooves 43 along the same side of the central axis 44 as represented by the set of three diagonal grooves 43 along each side of the central axis 44 in FIG. 9. In other embodiments, the diagonal grooves 43 could be oriented at two or more angles with respect to the rotational direction and/or central axis 44 whereby the diagonal grooves 43 along the same side of the central axis 44 are non-parallel. Two or more of the inlet ends 45 and the outlet ends 46 could be aligned circumferentially as represented in FIG. 9. Two or more inlet ends 45 and outlet ends 46 could be skewed or staggered. Two or more diagonal groove 43 could have the same or different lengths.

Two or more diagonal grooves 43 could communicate with a first feed groove 56 at the inlet ends 45 of the left-side diagonal grooves 43. Two or more other diagonal grooves 43 could communicate with a second feed groove 57 at the inlet ends 45 of the right-side diagonal grooves 43. Each first and second feed groove 56, 57 is a channel, depression, flute, or the like disposed along the outer annular surface 36. Although the feed grooves 56, 57 are represented as linear elements, it is understood that other designs are possible including multi-linear and non-linear configurations. The feed grooves 56, 57 are separately oriented to either side of the central axis 44. The feed grooves 56, 57 could be substantially perpendicular or oblique to the rotational direction and/or central axis 44, the former represented in FIG. 9.

The dimensions, angular orientation and number of the diagonal grooves 43 and feed grooves 56, 57 are design dependent and based in part on the translational range of the rotatable runner 35, the widths of the annular seal rings 23, 24, center ring 25 and optional hole 31, the extent of overlap or non-overlap between adjacent groove structures 41, the number of flows from a groove structure 41 required to impinge each annular seal ring 23, 24, the pressure required to adequately seal the interface between the rotatable runner 35 and annular seal rings 23, 24, and/or other design factors.

Each diagonal groove 43 further includes at least two steps 62a-62d. Although four steps 62a-62d are illustrated along the diagonal grooves 43 in FIG. 9, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43.

When the diagonal grooves 43 intersect a first feed groove 56 or a second feed groove 57, the first step 62a may be located at the first feed groove 56 or the second feed groove 57 and immediately adjacent to and communicable with the next step 62b along each diagonal groove 43. In other embodiments, two or more steps may reside within the first feed groove 56 or the second feed groove 57 and at least one step along each diagonal groove 43. In yet other embodiments, one step 62a may reside along the first feed groove 56 or the second feed groove 57 and a portion of one or more diagonal grooves 43 and the remaining step(s) 62b reside(s) exclusively along each diagonal groove 43, as illustrated in FIG. 9. Regardless of the exact arrangement, the steps 62a-62d are arranged consecutively to effect a stepwise variation of the depth along the length of each groove structure 41.

Referring again to FIG. 9, a gas enters the inlet(s) 26 and is directed inward onto the center ring 25. The gas flows around the center ring 25 traversing the gaps between the center ring 25 and the first and second annular seal rings 23, 24 when the center ring 25 does not include the optional holes 31. The gas traverses the holes 31 when the center ring 25 includes the optional holes 31. Next, the gas impinges along or near the feed grooves 56, 57 along outer annular surface 36 of the rotatable runner 35. The gas is bifurcated by the groove structure 41 so as to separately enter the first and second feed grooves 56, 57 so that a first portion is directed into the inlet ends 45 of the left-side diagonal grooves 43 and a second portion is directed into the inlet ends 45 of the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35.

Referring now to FIGS. 10-13, several seal assemblies 1 are shown in cross-sectional form disposed about a rotatable runner 15, the latter illustrated in side-view form, between a pair of compartments 5, 6. The rotatable runner 15 includes a plurality of groove structures 41. The groove structures 41 are arranged circumferentially along the outer annular surface 16 of the rotatable runner 15 immediately adjacent to the seal assembly 1. The groove structures 41 are positioned so as to communicate a gas onto the annular seal rings 3, 4 as the rotatable runner 15 rotates with respect to the seal assembly 1. In some embodiments, it might be advantageous for adjacent grooves structures 41 to partially overlap. In other embodiments, adjacent groove structures 41 could be arranged in an end-to-end configuration or with a separation between the end of one groove structure 41 and the start of the next groove structure 41, the latter represented in FIGS. 10-13.

Each groove structure 41 further includes at least two axial grooves 49 disposed about a central axis 44 circumferentially along an outer annular surface 16 of the rotatable runner 15. The axial grooves 49 could be aligned symmetrically or non-symmetrically about the central axis 44. Each axial groove 49 is a channel, depression, flute, or the like disposed along the outer annular surface 16. Although the axial grooves 49 are represented as linear elements, it is understood that other designs are possible including multi-linear and non-linear configurations. The central axis 44 could align with the gap 13 between the first and second annular seal rings 3, 4 or reside adjacent to the first and second annular seal rings 3, 4 to allow communication of a gas onto the groove structures 41 over the translational range of the rotatable runner 15. The axial grooves 49 are oriented substantially parallel to the rotational direction of the rotatable runner 15 and/or the central axis 44.

At least two axial grooves 49 are disposed along each side of the central axis 44. The axial grooves 49 could be substantially parallel to other axial grooves 49 along the same side of the central axis 44 as represented by the set of two or more axial grooves 49 along each side of the central axis 44 in FIGS. 10-13. Two or more of the inlet ends 45 and the outlet ends 46 could be aligned circumferentially as represented in FIGS. 10-13. It is also possible for the inlet ends 45 and the outlet ends 46 to be skewed or staggered and/or and the axial grooves 49 to have the same or different lengths.

The axial grooves 49 communicate with a feed groove 42 at the inlet ends 45 of the axial grooves 49. The feed groove 42 is a channel, depression, flute, or the like disposed along the outer annular surface 16. Although the feed groove 42 is represented as a linear element, it is understood that other designs are possible including multi-linear and non-linear configurations. The feed groove 42 traverses the central axis 44. The feed groove 42 could be substantially perpendicular or oblique to the rotational direction and/or central axis 44.

The dimensions, angular orientation and number of the axial grooves 49 are design dependent and based in part on the translational range of the rotatable runner 15, the widths of the annular seal rings 3, 4, the extent of overlap or non-overlap between adjacent groove structures 41, the number of flows from a groove structure 41 required to impinge each annular seal ring 3, 4, the pressure required to adequately seal the interface between the rotatable runner 15 and annular seal rings 3, 4, and/or other design factors.

An optional windback thread 47 could extend from the annular seal housing 2 in the direction of the second compartment 6. The windback thread 47 is an element known within the art that utilizes the shear forces produced by a rotating shaft to circumferentially wind a fluid along one or more threads. The threads are disposed along the inner annular surface of the windback thread 47 and oriented so that a fluid enters the threads and is directed away from the annular seal rings 3, 4 within a seal assembly 1. The windback thread 47 could be machined into the annular seal housing 2 or mechanically attached or fastened thereto as a separate element via methods understood in the art. The windback thread 47 is disposed about the runner 15 so as to overlay the runner 15 without contact. A plurality of optional slots 48 are positioned along one end of the rotatable runner 15 adjacent to the windback thread 47. The slots 48 could interact with the windback thread 47 to sling a fluid away from the annular seal rings 3, 4 in the direction of the second compartment 6. Although shown with several embodiments, it is understood that an optional windback thread 47 is applicable to other embodiments described herein.

Figure 11:
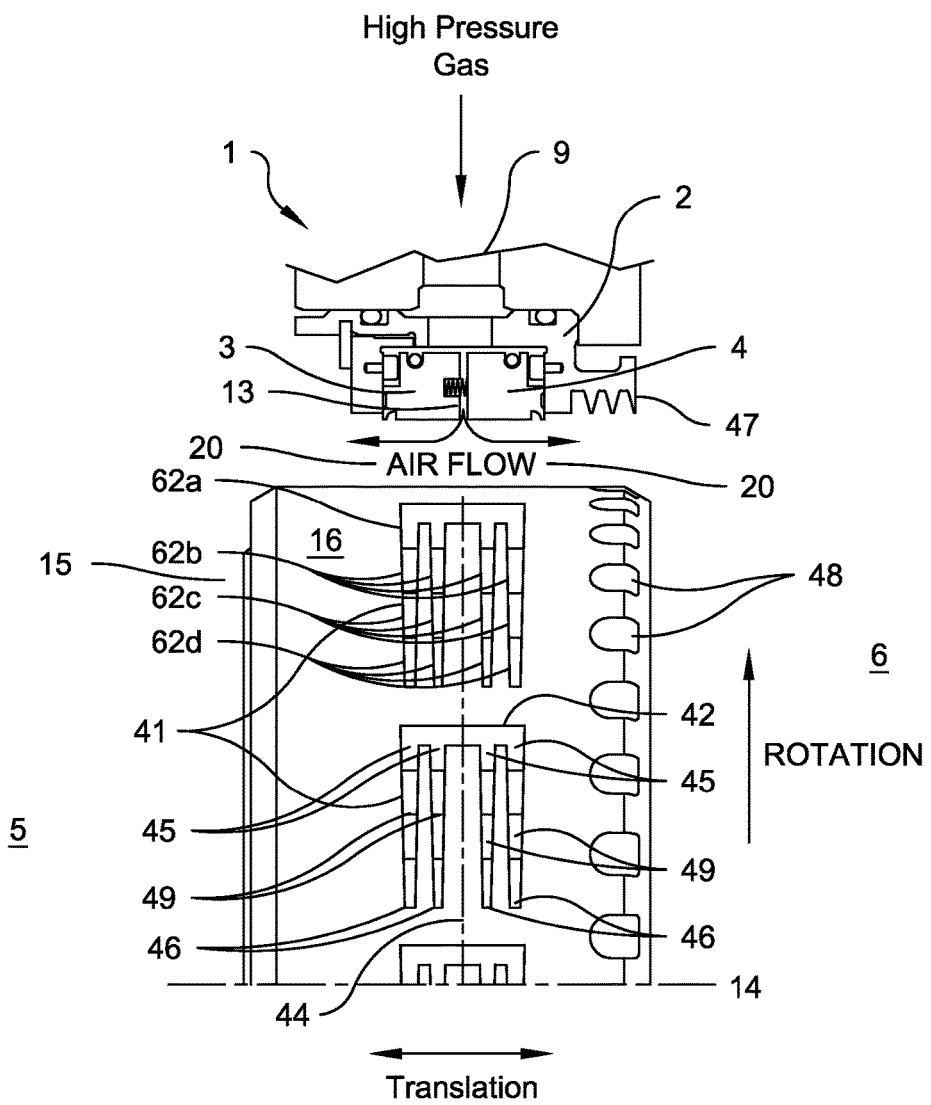
FIG. 11 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) and optional slots positioned along one end of the rotatable runner adjacent to the windback thread wherein an outer annular surface along the runner includes a plurality of multi-groove structures separately disposed thereon whereby the grooves are tapered, each groove includes at least two steps, and each multi-groove structure communicates with both seal rings in accordance with an embodiment of the invention.

In some embodiments, it might be advantageous to taper the axial grooves 49 as represent in FIG. 11. The axial groove 49 could include a width at the inlet end 45 that is greater than the width at the outlet end 46 so that the width decreases with distance along the axial groove 49. This arrangement progressively reduces the volume through which the gas passes causing a gas to compress with distance along the axial groove 49, thereby further increasing the pressure otherwise achieved along an axial groove 49 with uniform width. This effect is also possible by tapering the axial groove 49 depthwise along the length of the axial groove 49 so that the depth at the inlet end 45 is greater than the depth at the outlet end 46.

Figure 12:
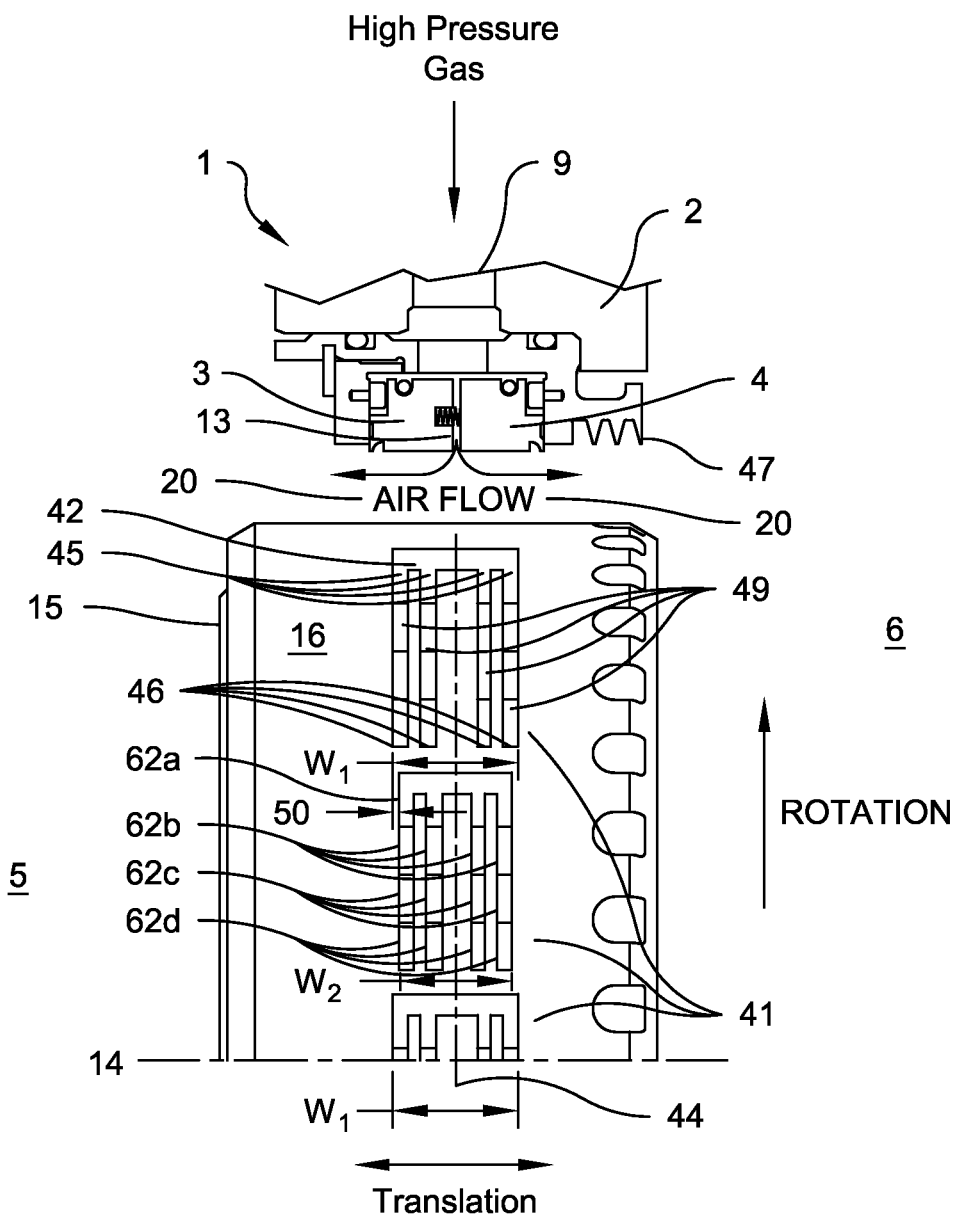
FIG. 12 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) wherein an outer annular surface along the runner includes a plurality of multi-groove structures separately disposed thereon whereby the width of adjacent multi-groove structures vary, each groove includes at least two steps, and each multi-groove structure communicates with both seal rings in accordance with an embodiment of the invention.
Figure 13:
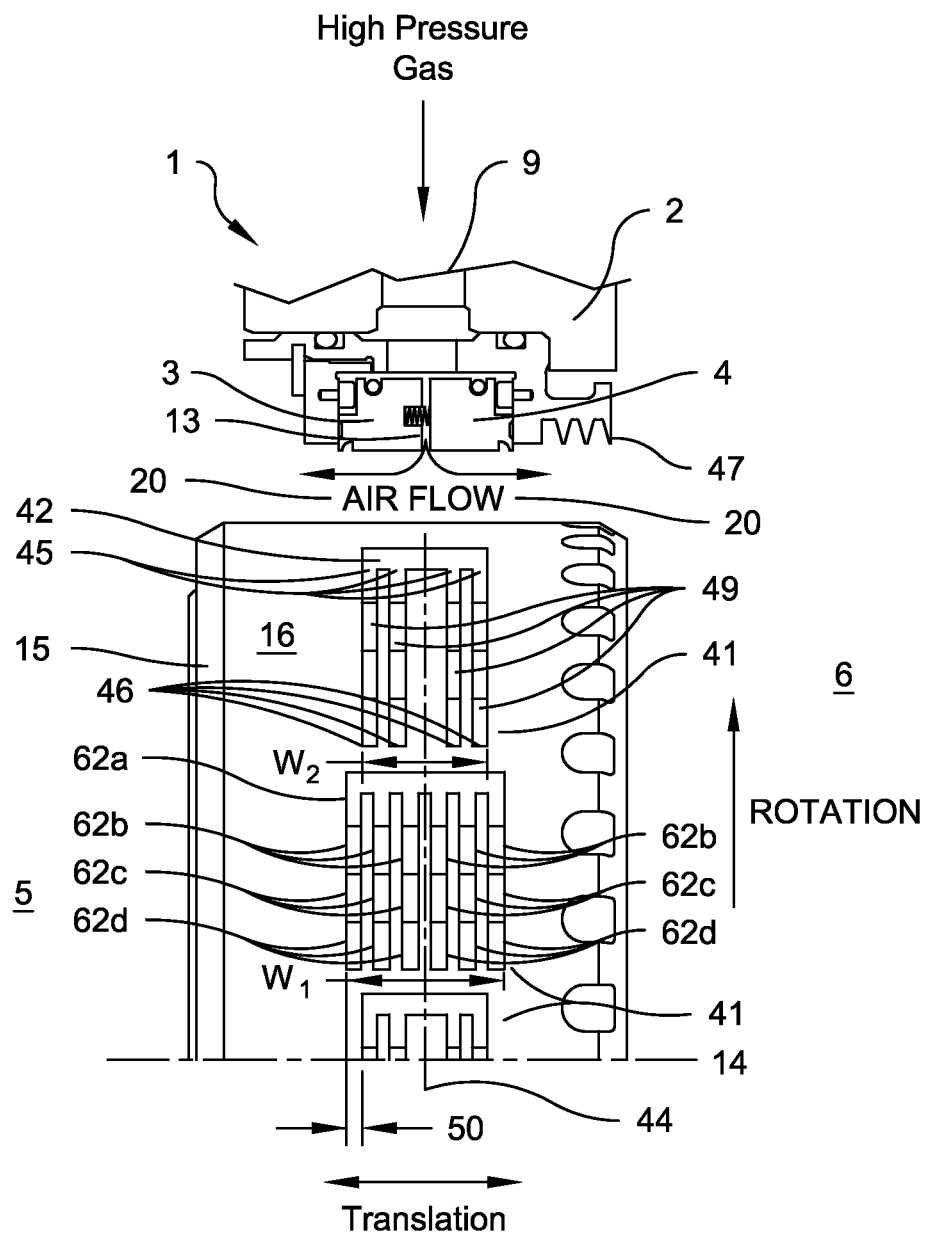
FIG. 13 is a partial cross section view illustrating an annular seal assembly including a pair of annular seal rings separated by a gap within a seal housing with an optional windback thread disposed about a rotatable runner attached to a shaft (cross section of annular seal assembly and runner below centerline and shaft not shown) wherein an outer annular surface along the runner includes a plurality of multi-groove structures separately disposed thereon whereby the number of grooves within adjacent multi-groove structures vary, each groove includes at least two steps, and each multi-groove structure communicates with both seal rings in accordance with an embodiment of the invention.

In yet other embodiments, the groove structures 41 could vary widthwise as represented in FIGS. 12 and 13. The width between adjacent groove structures 41 could differ so that the axial width $W_1$ of one groove structure 41 is greater than the axial width $W_2$ of the next groove structure 41 resulting in an overhang 50. The overhang 50 facilitates a staggered arrangement of axial grooves 49 between adjacent groove structures 41 when the total number of axial grooves 49 is the same in each groove structure 41 as represented in FIG. 12 and when the total numbers of axial grooves 49 differ between groove structures 41 as represented in FIG. 13. Both embodiments increase sealing effects over a greater range of translations by a rotatable runner 15.

Each axial groove 49 further includes at least two steps 62a-62d. Although four steps 62a-62d are illustrated along the axial grooves 49 in FIGS. 10-13, it is understood that two or more such steps 62a-62d may reside along each axial groove 49. Each step 62a-62d corresponds to a change in the local depth of the axial groove 49 relative to the outer annular surface 16. For example, if an axial groove 49 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each axial groove 49.

When the axial grooves 49 intersect a feed groove 42, the first step 62a may be located at the feed groove 42 and immediately adjacent to and communicable with the next step 62b along each axial groove 49. In other embodiments, two or more steps may reside within the feed groove 42 and at least one step along each axial groove 49. In yet other embodiments, one step 62a may reside along the feed groove 42 and a portion of one or more axial grooves 49 and the remaining step(s) 62b reside(s) exclusively along each axial groove 49, as illustrated in FIGS. 10-13. Regardless of the exact arrangement, the steps 62a-62d are arranged consecutively to effect a stepwise variation of the depth along the length of each groove structure 41.

Referring again to FIGS. 10-13, a gas enters the inlet(s) 9 and is directed into the gap 13 between the annular seal rings 3, 4. The gas traverses the gap 13 thereafter impinging the feed groove 42 along outer annular surface 16 of the rotatable runner 15. The gas is bifurcated along the feed groove 42 allowing the gas to enter the inlet ends 45 so that a first portion is directed into the left-side axial grooves 49 and a second portion is directed into the right-side axial grooves 49. The quantity and/or rate of gas communicated onto each of the annular seal rings 3, 4 may be the same or different. The gas traverses the respective axial grooves 49 and is redirected outward from the rotatable runner 15 at the outlet end 46 of each axial groove 49. The gas exits at least one left-side axial groove 49 within a groove structure 41 and impinges the first annular seal ring 3 forming a thin-film layer 20 between the first annular seal ring 3 and rotatable runner 15, thereby separating the first annular seal ring 3 from the rotatable runner 15. The gas exits at least one right-side axial groove 49 within a groove structure 41 and impinges the second annular seal ring 4 forming a thin-film layer 20 between the second annular seal ring 4 and rotatable runner 15, thereby separating the second annular seal ring 4 from the rotatable runner 15.

In some embodiments, it might be advantageous to direct a gas through the rotatable runner 15 or 35 rather than or in addition to between the first and second annular seal rings 3, 4 or 23, 24.

Figure 14:
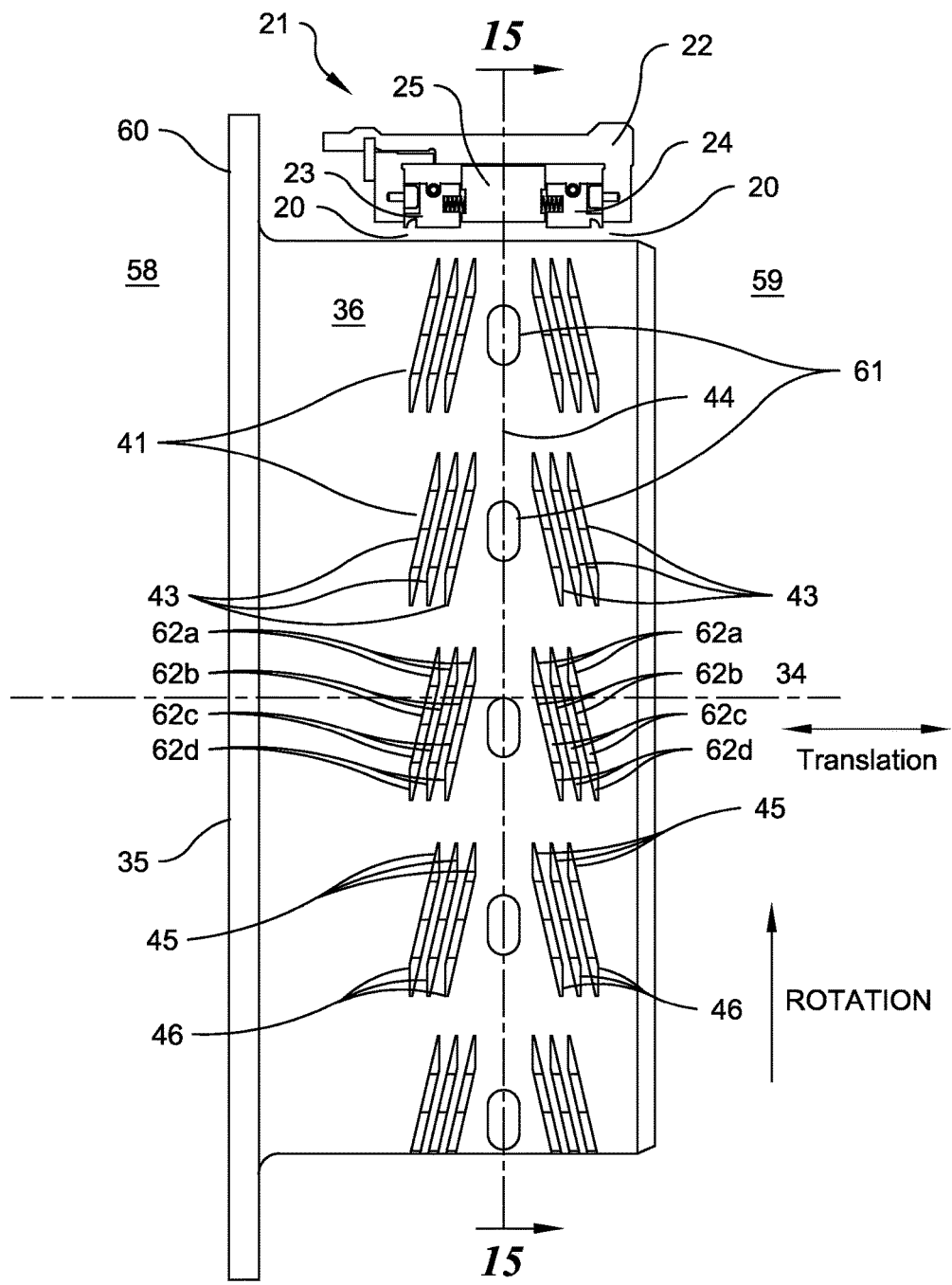
FIG. 14 is a partial cross section view illustrating an annular seal assembly including a pair of annular seal rings separated by a center ring within a seal housing disposed about a rotatable runner attached to a shaft (cross section of annular seal assembly below runner and shaft not shown) wherein an outer annular surface along the runner includes a plurality of bifurcated multi-groove structures separately disposed thereon whereby each groove includes at least two steps, each multi-groove structure communicates with both seal rings, and a plurality of through holes are disposed along the rotatable runner in accordance with an embodiment of the invention.
Figure 15:
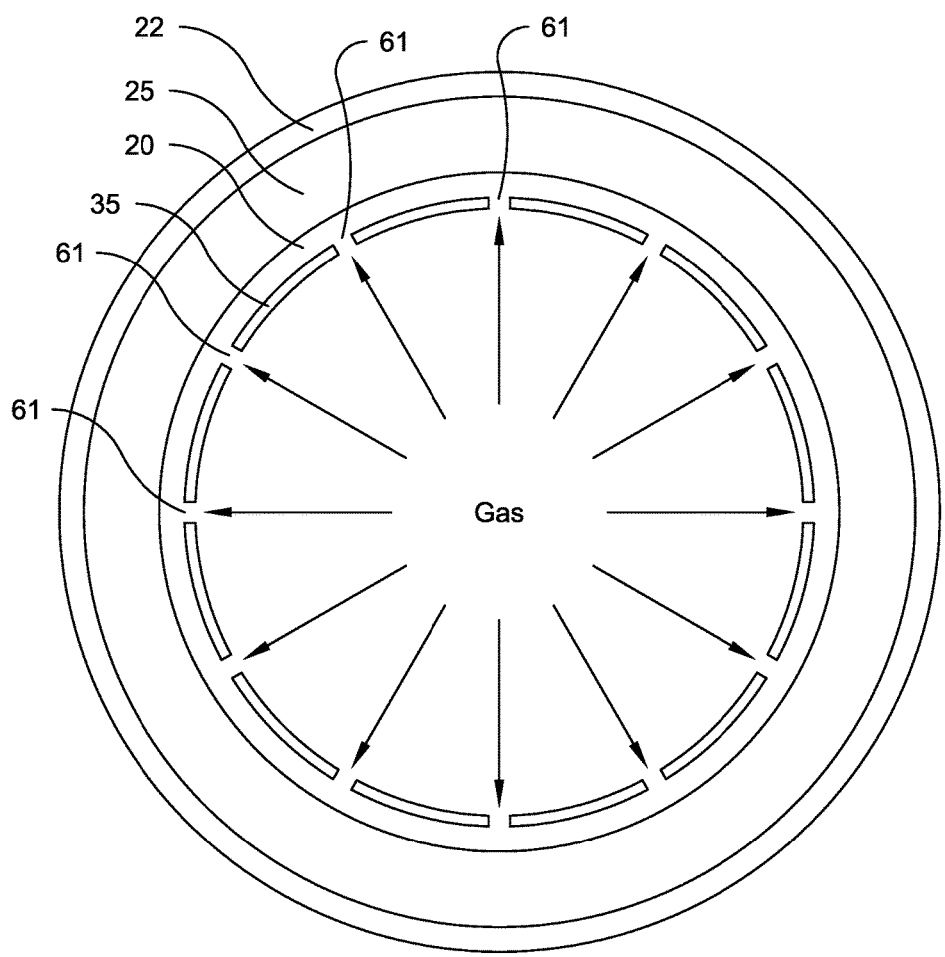
FIG. 15 is a cross section view illustrating the annular seal housing, the center ring, and the rotatable runner with through holes wherein the holes communicate a gas through the rotatable runner and onto the outer annular surface of the rotatable runner so that the gas enters the stepped grooves along the rotatable runner for redirection onto the inner annular surface of a first annular seal ring and a second annular seal ring in accordance with an embodiment of the invention.

Referring now to FIGS. 14 and 15, a seal assembly 21 is shown in cross-sectional form disposed about a rotatable runner 35, the latter illustrated in side-view form, between a first compartment 58 and a second compartment 59. The first and second compartments 58, 59 could include a low pressure gas. Gas within the second compartment 59 could be at a higher pressure than the first compartment 58. One or both compartments 58, 59 could further include a lubricant. The annular seal housing 22 could include an optional windback thread 47 as illustrated in FIGS. 10-13.

The rotatable runner 35 includes a plurality of groove structures 41 and could further include an optional flange 60. The groove structures 41 are arranged circumferentially along the outer annular surface 36 of the rotatable runner 35 immediately adjacent to the seal assembly 21. The groove structures 41 are positioned so as to communicate a gas onto the annular seal rings 23, 24 as the rotatable runner 35 rotates with respect to the seal assembly 21. While FIG. 14 shows bifurcated groove structures 41, it is understood that all groove structures 17, 37, 41, 55 described herein are applicable to embodiments wherein a gas is directed through a rotatable runner 15, 35. An optional center ring 25 could be interposed between the first and second annular seal rings 23, 24, as otherwise described herein. It is likewise possible for the seal assembly 21 to not include a center ring 25, as also described herein.

A plurality of through holes 61 are separately disposed about the circumference of the rotatable runner 35, as represented in FIGS. 14 and 15. Each through hole 61 could traverse the rotatable runner 35 so as to allow passage of a gas along one side of the rotatable runner 35 to another side of the rotatable runner 35, preferably from a region adjacent to the inner portion of the rotatable runner 35 and onto the outer annular surface 36 of the rotatable runner 35 adjacent to the groove structures 41 and the first and second annular seal rings 23, 24.

The number, size, shape, location, and arrangement of the through holes 61 should allow communication of a gas through the rotatable runner 35 and onto the outer annular surface 36 so as to form a thin film 20 between the first and second annular seal rings 23, 24 and the rotatable runner 35. In some embodiments, it might be advantageous for each through hole 61 to be elongated along the central axis 44 and aligned therewith with one such through hole 61 interposed between each paired arrangement of diagonal grooves 43, as represented in FIG. 14. Other configurations are possible.

Each diagonal groove 43 further includes at least two steps 62a-62d. Although four steps 62a-62d are illustrated along each diagonal groove 43 in FIG. 14, it is understood that two or more such steps 62a-62d may reside along each diagonal groove 43. Each step 62a-62d corresponds to a change in the local depth of the diagonal groove 43 relative to the outer annular surface 36. For example, if a diagonal groove 43 includes two steps 62a, 62b, then one step 62a would have a first depth and another step 62b would have a second depth. The depths differ so that one depth is deeper and another depth is shallower. In preferred arrangements, the steps 62a-62d are arranged so that the change in local depth from one step to another step results in a stepwise variation along the length of each diagonal groove 43. Regardless of the exact arrangement, the steps 62a-62d are arranged consecutively to effect a stepwise variation of the depth along the length of each groove structure 41.

Referring again to FIGS. 14 and 15, a gas enters the through holes 61 along the rotatable runner 35 and is directed outward in the direction of the first and second annular seal rings 23, 24 with or without the center ring 25. The gas flows onto the rotatable runner 35 so as to impinge the outer annular surface 36 of the rotatable runner 35, preferably at or near the inlet ends 45. The gas is bifurcated by the groove structure 41 at the inlet ends 45 so that a first portion is directed into the left-side diagonal grooves 43 and a second portion is directed into the right-side diagonal grooves 43. The quantity and/or rate of gas communicated onto each of the annular seal rings 23, 24 may be the same or different. The gas traverses the respective diagonal grooves 43 and is redirected outward from the rotatable runner 35 at the outlet end 46 of each diagonal groove 43. The gas exits at least one left-side diagonal groove 43 within a groove structure 41 and impinges the first annular seal ring 23 forming a thin-film layer 20 between the first annular seal ring 23 and rotatable runner 35, thereby separating the first annular seal ring 23 from the rotatable runner 35. The gas exits at least one right-side diagonal groove 43 within a groove structure 41 and impinges the second annular seal ring 24 forming a thin-film layer 20 between the second annular seal ring 24 and rotatable runner 35, thereby separating the second annular seal ring 24 from the rotatable runner 35.

As described herein, a gas enters the diagonal or axial groove 19, 38, 43 49 so that some or all of the gas entering the groove 19, 38, 43, 49 either partially or completely traverses the length thereof. The inward flow of the gas results in a pressure gradient. The result is a pressure profile that steadily increases along the length of the groove 19, 38, 43, 49 so that the pressure downstream is generally higher than the pressure upstream. The pressure profile may be linear, non-linear, or a combination thereof.

Figure 16:
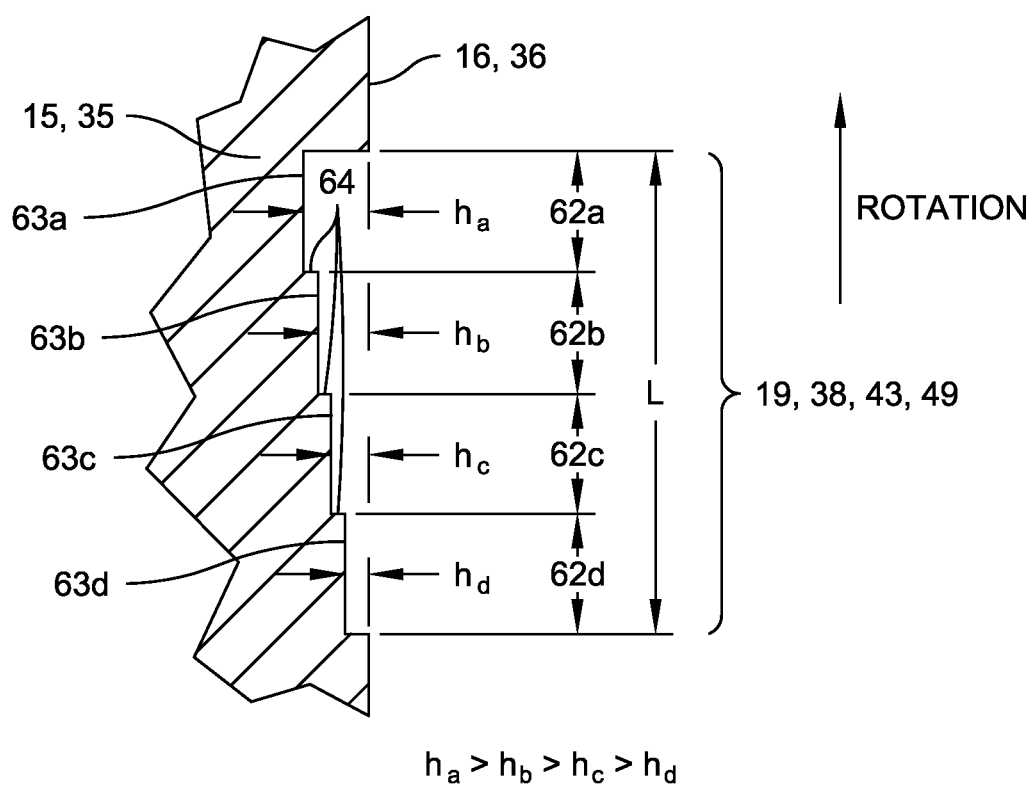
FIG. 16 is a cross section view illustrating a stepped groove with an exemplary profile whereby the depth of each adjoining step decreases in the direction opposite to rotation in accordance with an embodiment of the invention.
Figure 17:
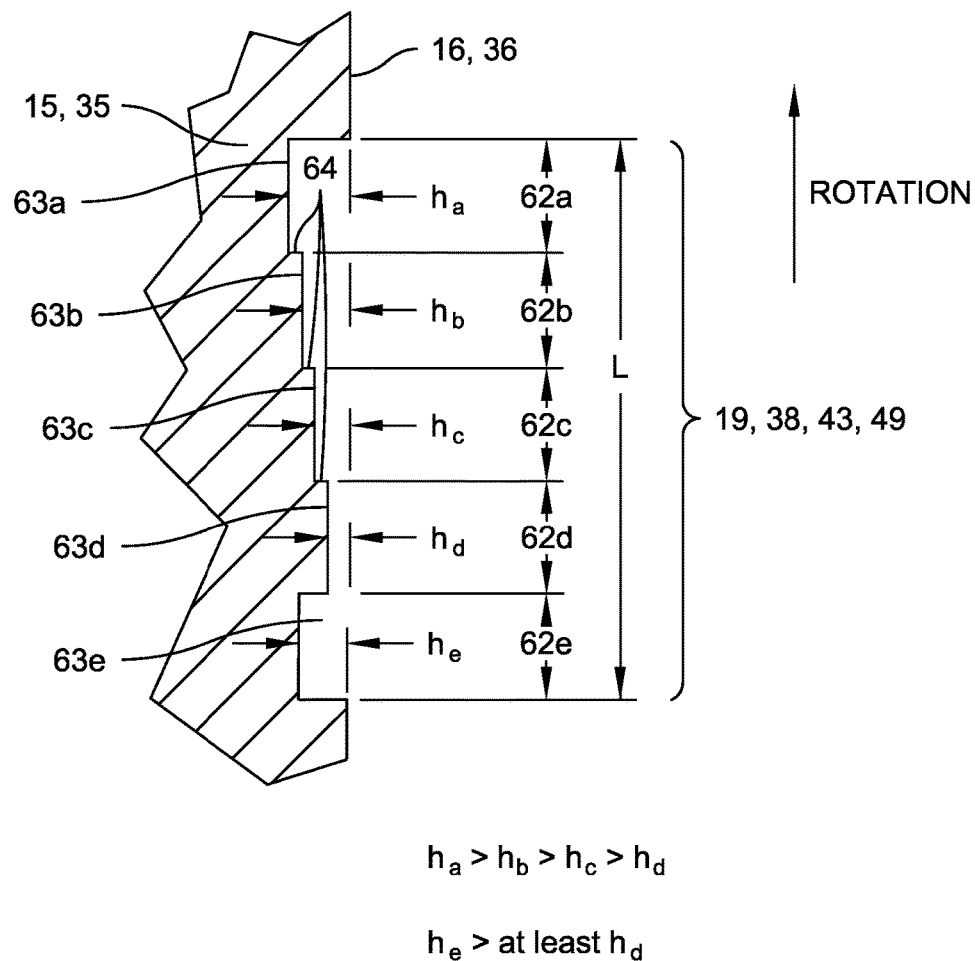
FIG. 17 is a cross section view of a rotatable runner illustrating an alternate stepped groove whereby the depth of at least one adjoining step decreases in the direction opposite to rotation and the depth of at least one adjoining step increases in the direction opposite to rotation in accordance with an embodiment of the invention.

Referring now to FIGS. 16 and 17, exemplary radial and axial grooves 19, 38, 43, 49 with four steps 62a-62d and five steps 62a-62e, respectively, are shown in an end-to-end configuration along the outer annular surface 16, 36 of a rotatable runner 15, 35. The steps 62a-62d, 62a-62e form a single pocket-like structure that opens outward in the direction of the outer annular surface 16, 36. FIG. 16 illustrates the stepwise orientation of the steps 62a-62d whereby the first step 62a, second step 62b, third step 62c, and fourth step 62d separately extend into the rotatable runner 15, 35 at four depths $h_a$, $h_b$, $h_c$, $h_d$, respectively. FIG. 17 illustrates the stepwise orientation of the steps 62a-62e whereby the first step 62a, second step 62b, third step 62c, fourth step 62d, and fifth step 62e separately extend into the rotatable runner 15, 35 at five depths $h_a$, $h_b$, $h_c$, $h_d$, $h_e$ respectively. In preferred embodiments, the depths $h_a$, $h_b$, $h_c$, $h_d$ should decrease incrementally ($h_a > h_b > h_c > h_d$) in the direction opposite of the rotational direction of the rotatable runner 15, 35. However, it is only required that at least one downstream step 62b-62d be at a depth less than one upstream step 62a-62c. In other embodiments, it might be advantageous to include at least one downstream step 62b-62e at a depth $h_b$, $h_c$, $h_d$, $h_e$ greater than the depth $h_a$, $h_b$, $h_c$, $h_d$ of at least one upstream steps 62a-62d.

Referring again to FIGS. 16 and 17, the depths $h_a$, $h_b$, $h_c$, $h_d$, $h_e$ generally represent the distance from the outer annular surface 16, 36 to the base 63a-63e of each respective step 62a-62e, although other methods of determining the depths $h_a$, $h_b$, $h_c$, $h_d$, $h_e$ are possible. Each base 63a-63e is defined by a surface of generally planar extent along the rotatable runner 15, 35; however, other shapes are possible. The bases 63a-63e may be oriented so that two or more such bases 63a-63e are parallel, as shown in FIGS. 16 and 17. Regardless of the shape and orientation of each base 63a-63e, the transition from one step 62a-62d to another step 62b-62e defines a shoulder 64. The shoulder 64 represents an abrupt change or discontinuity in the depth profile between the inlet and outlet end of the diagonal groove 19, 38, 43 and the axial groove 49.

As the rotatable runner 15, 35 rotates, a gas adjacent to or communicated onto the rotatable runner 15, 35 flows into and along the steps 62a-62e in the direction opposite to the rotational direction of the rotatable runner 15, 35. In addition to or in place of the flow patterns implemented by the various groove structures 17, 37, 41, 55 as otherwise described herein, interaction between the gas and each shoulder 64 redirects the circumferential flow along each step 62a-62e so that some or all of the gas is locally directed radially outward toward the first and second annular seal rings 3, 4 or 23, 24. The result is turbulent flow adjacent to each shoulder 64 causing localized pressure discontinuities along the pressure profile described herein that enhance the thin-film layer 20 formed between the outer annular surface 16, 36 and first and second annular seal rings 3, 4 or 23, 24. The enhanced stiffness of the resultant thin-film layer 20 allows for higher operating differential pressures without the seal contacting the runner which extends seal life and lowers heat generation. The gas that leaks thru the thin-film layer 20 prevents or minimizes a lubricant from leaking into the sealing chamber and/or entering one or both lower pressure compartments 5, 6.

Figure 18:
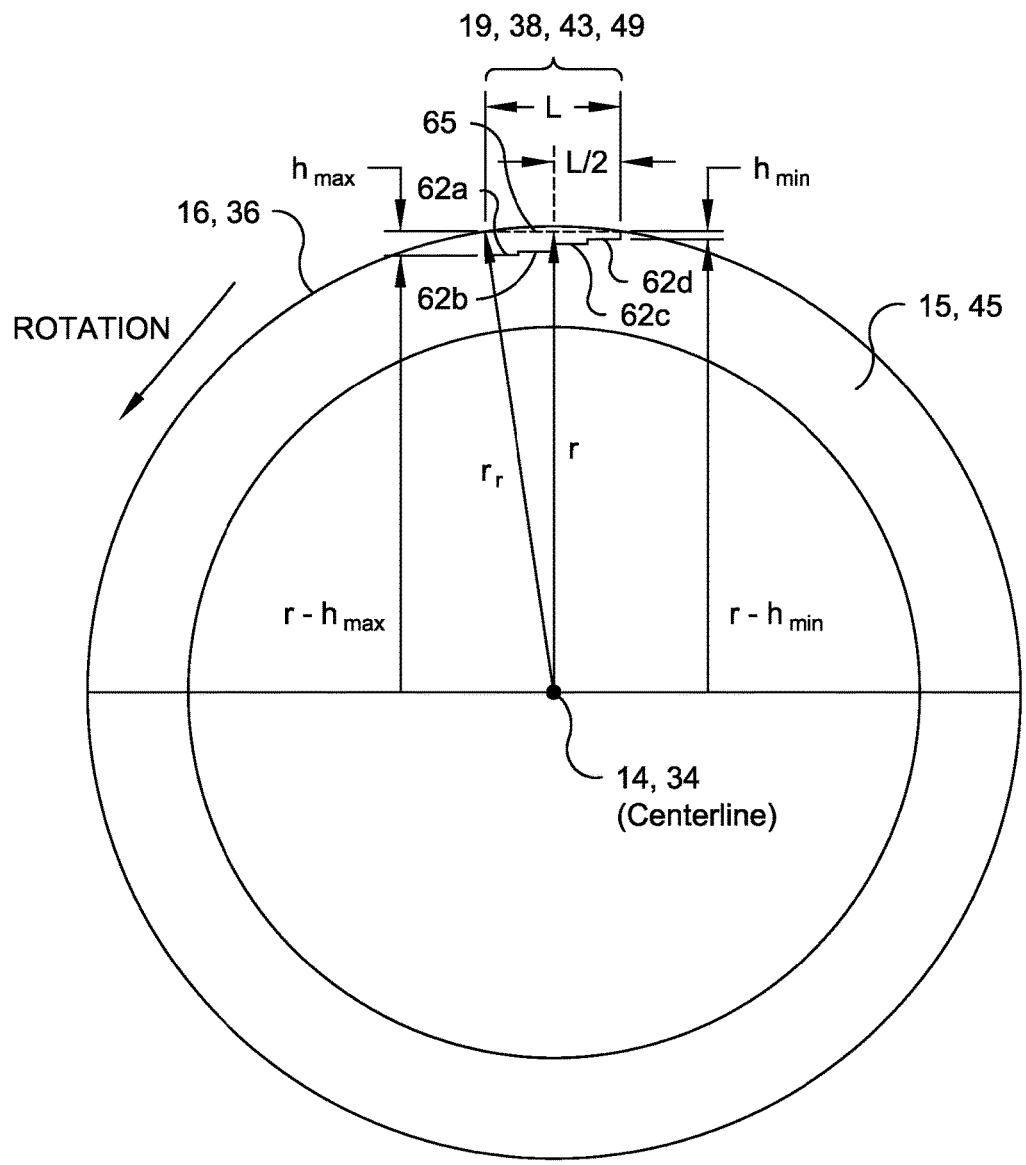
FIG. 18 is a cross section view illustrating dimensions along a rotatable runner and a stepped groove for calculating the distance ratio (R) based on the adjusted radial distance (r−h) over the runner radius ($r_r$) whereby the upper distance ratio ($R_U$) corresponds to the shallowest step (($r−h_{min}$)/$r_r$) and the lower distance ratio ($R_L$) corresponds to the deepest step (($r−h_{max}$)/$r_r$).
Figure 19A:
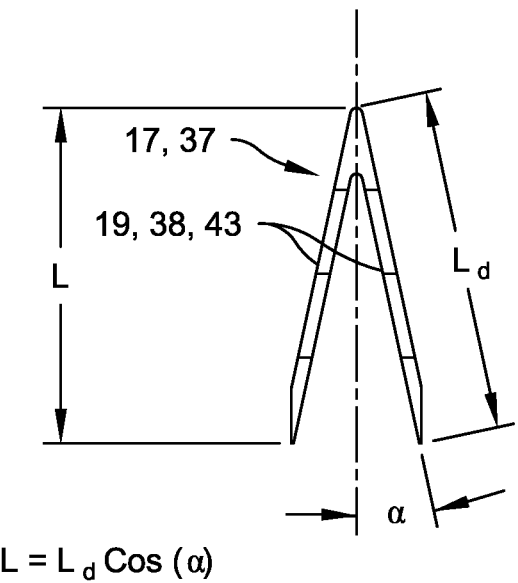
FIG. 19a is an enlarged view illustrating the length (L) of a groove structure with stepped grooves aligned diagonal to the direction of rotation in accordance with an embodiment of the invention.
Figure 19B:
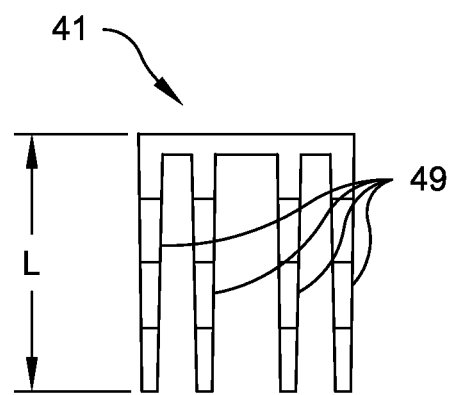
FIG. 19b is an enlarged view illustrating the length (L) of a groove structure with stepped grooves aligned along the direction of rotation in accordance with an embodiment of the invention.

Referring now to FIG. 18, a groove 19, 38, 43, 49 is shown along the outer annular surface 16, 36 of a rotatable runner 15, 35. The groove 19, 38, 43, 49 is shown with steps 62a-62d arranged stepwise so that the deepest step 62a is at the leftmost or upstream end and the shallowest step 62d is at the rightmost or downstream end. The groove 19, 38, 43, 49 is defined to include a length (L) centered with the centerline 14, 34 so that one-half of the length (L) is to the left of the centerline 14, 34 and one-half of the length (L) is to the right of the centerline 14, 34. Each step 62a-62d has a unique depth (h) whereby the deepest groove defines the maximum depth ($h_{max}$) and the shallowest groove defines the minimum depth ($h_{min}$). The left end of the leftmost step 62a and the right end of the rightmost step 62d intersect the outer annular surface 16, 36 thereby defining a line 65. The line 65 intersects the radial distance (r), drawn from the centerline 14, 34, at a right angle.

The location of each base 63a-63e may be defined as by distance ratio (R) representing the radial distance (r) adjusted by the depth (h) of a step 62a-62e over the runner radius $r_r$. The distance ratio (R) is calculated by the equation $$R = \frac{r-h}{r_r} \quad (1)$$

where r is further calculated by the equation $$r = \sqrt{r_r^2 - \left(\frac{L}{2}\right)^2} \quad (2)$$

whereby the combination of equations (1) and (2) yields the equation $$R = \frac{\sqrt{\left(r_r^2 - \left(\frac{L}{2}\right)^2\right)} - h}{r_r} \quad (3)$$

For purpose of Equation (3), the length (L) corresponds to the chord or circumferential length as described in FIGS.

19*a* and 19*b* after all appropriate adjustments (if required) and the depth (h) of a groove 62*a*-62*e* corresponds to the vertical distance between line 65 and the base 63*a*-63*e*. If the base 63*a*-63*e* is non-planar or angled, then a maximum depth or an average depth may be appropriate for calculational purposes. The lower and upper bounds for the distance ratio (R) for a groove 19, 38, 43, 49 are calculable for a given length (L) and runner radius ($r_r$) where the lower distance ratio ($R_L$) corresponds to the maximum depth ($h_{max}$) and the upper distance ratio ($R_U$) corresponds to the minimum depth ($h_{min}$).

Figure 20:
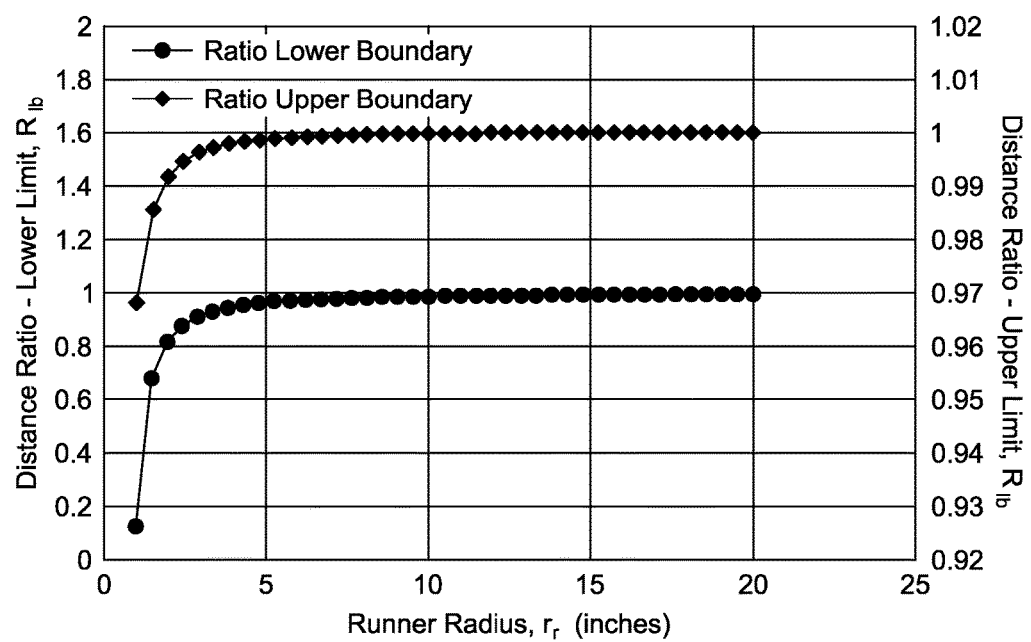
FIG. 20 is an exemplary plot illustrating the distance ratio (R) for rotatable runners with a radius from 1-inches to 20-inches whereby the upper limit of the distance ratio ($R_U$) corresponds to a length (L) of 0.5-inches and a minimum step depth ($h_{min}$) of 0.00001-inches and the lower limit of the distance ratio ($R_L$) corresponds to a length (L) of 1.95-inches and a maximum step depth ($h_{max}$) of 0.1-inches.

Referring now to FIG. 20, the lower distance ratio ($R_L$) and upper distance ratio ($R_U$) are depicted for a variety of design variations for a runner radius ($r_r$) from 1-inches to 20-inches. The lower distance ratio ($R_L$) corresponds to a length (L) of 1.95-inches and a maximum step depth (h) of 0.1-inches. The upper distance ratio ($R_U$) corresponds to a length (L) of 0.5-inches and a minimum step depth (h) of 0.00001-inches. The resultant lines define the design space for potential distance ratios (R) when the runner radius ($r_r$) is from 1-inch to 20-inches, the length (L) is from 0.5-inches to 1.95-inches, and the depth (h) is from 0.00001-inches to 0.1-inches.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A circumferential back-to-back seal assembly with bifurcated flow comprising:
   (a) an annular seal housing disposed between a pair of compartments, said annular seal housing having at least one inlet;
   (b) a first annular seal ring;
   (c) a second annular seal ring, said first annular seal ring and said second annular seal ring separately disposed within said annular seal housing, a gas communicable between said first annular seal ring and said second annular seal ring via said at least one inlet;
   (d) a rotatable runner, said first annular seal ring and said second annular seal ring disposed around said rotatable runner; and
   (e) a plurality of groove structures disposed along an outer annular surface of said rotatable runner, said gas communicable onto said groove structures, each said groove structure separates said gas so that a first portion of said gas is directed onto said first annular seal ring to form a first thin-film layer between said rotatable runner and said first annular seal ring and a second portion of said gas is directed onto said second annular seal ring to form a second thin-film layer between said rotatable runner and said second annular seal ring, each said groove structure having at least two grooves, each said groove includes at least two adjoining steps wherein each said adjoining step has a base disposed at a depth (h), said depth (h) decreases from at least one said adjoining step to another said adjoining step in the direction opposite to rotation, a shoulder disposed between two said adjoining steps, said shoulder locally redirects said gas outward toward said first annular seal ring or said second annular seal ring,
   said grooves separately disposed about a central axis aligned adjacent to said first annular seal ring and said second annular seal ring,
   said grooves disposed diagonally with respect to rotational direction of said rotatable runner,
   said grooves being communicable with a feed groove which directs said gas into said grooves,
   at least one said groove structure has a secondary groove structure.

2. The circumferential back-to-back seal assembly of claim 1, wherein said depth (h) increases from at least one said adjoining step to another said adjoining step in the direction opposite to rotation.

3. The circumferential back-to-back seal assembly of claim 1, wherein each said groove having a length (L) and disposed along said rotatable runner having a runner radius ($r_r$), each said groove with one said adjoining step having a minimum depth ($h_{min}$) and other said adjoining step having a maximum depth ($h_{max}$), whereby a distance ratio (R) representing a radial distance (r) of said base over said runner radius ($r_r$) is determined from the equation:

$$R = \frac{\sqrt{\left(r_r^2 - \left(\frac{L}{2}\right)^2\right)} - h}{r_r}.$$

4. The circumferential back-to-back seal assembly of claim 3, wherein said distance ratio (R) for each said groove includes a lower distance ratio ($R_L$) when said depth (h) equals said maximum depth ($h_{max}$) and an upper distance ratio ($R_U$) when said depth (h) equals said minimum depth ($h_{min}$), said distance ratio (R) for each said adjoining step within the range from said lower distance ratio ($R_L$) to said upper distance ratio ($R_U$).

5. The circumferential back-to-back seal assembly of claim 1, further comprising:
   (f) a plurality of springs disposed between and directly contacts said first annular seal ring and said second annular seal ring, said springs separate said first annular seal ring and said second annular seal ring to form a gap, said gas traverses said gap before communication onto said groove structures.

6. The circumferential back-to-back seal assembly of claim 1, further comprising:
   (f) a center ring disposed within said annular seal housing between said first annular seal ring and said second annular seal ring, said center ring has a plurality of holes communicable with said at least one inlet, said gas traverses said holes before communication onto said groove structures; and
   (g) a plurality of springs disposed between said center ring and each of said first annular seal ring and said second annular seal ring, said springs separate said first annular seal ring and said second annular seal ring away from said center ring.

7. The circumferential back-to-back seal assembly of claim 1, further comprising:
   (f) a center ring disposed within said annular seal housing between said first annular seal ring and said second annular seal ring; and
   (g) a plurality of springs disposed between said center ring and each of said first annular seal ring and said second annular seal ring, said springs separate said first annular seal ring and said second annular seal ring away from said center ring, said gas flows around said center ring before communication onto said groove structures.

8. The circumferential back-to-back seal assembly of claim 1, wherein said grooves of said secondary groove structure are disposed about and communicable with an apex.

9. The circumferential back-to-back seal assembly of claim 1, wherein said grooves vary either axially or circumferentially lengthwise.

10. The circumferential back-to-back seal assembly of claim 1, wherein at least one said groove is tapered widthwise.

11. The circumferential back-to-back seal assembly of claim 1, wherein at least one said groove has a constant width.

12. The circumferential back-to-back seal assembly of claim 1, wherein adjacent said groove structures vary widthwise.

13. The circumferential back-to-back seal assembly of claim 1, wherein said grooves separately disposed about said central axis aligned adjacent to said first annular seal ring and said second annular seal ring, adjacent said groove structures vary in number of said grooves.

14. The circumferential back-to-back seal assembly of claim 1, wherein said annular seal housing includes a windback thread adjacent to said compartment including a lubricant, said windback thread directs said lubricant away from said first annular seal ring and said second annular seal ring.

15. The circumferential back-to-back seal assembly of claim 14, wherein a plurality of slots positioned along said rotatable runner cooperate with said windback thread to sling said lubricant away from said first annular seal ring and said second annular seal ring.

16. A circumferential back-to-back seal assembly with bifurcated flow comprising:
(a) an annular seal housing disposed between a pair of compartments;
(b) a first annular seal ring;
(c) a second annular seal ring, said first annular seal ring and said second annular seal ring separately disposed within said annular seal housing;
(d) a rotatable runner with a plurality of through holes, said first annular seal ring and said second annular seal ring disposed around said rotatable runner; and
(e) a plurality of groove structures disposed along an outer annular surface of said rotatable runner, a gas communicable onto said groove structures via said through holes, each said groove structure separates said gas so that a first portion of said gas is directed onto said first annular seal ring to form a first thin-film layer between said rotatable runner and said first annular seal ring and a second portion of said gas is directed onto said second annular seal ring to form a second thin-film layer between said rotatable runner and said second annular seal ring, each said groove structure having at least two grooves, each said groove includes at least two adjoining steps wherein each said adjoining step has a base disposed at a depth (h), said depth (h) decreases from at least one said adjoining step to another said adjoining step in the direction opposite to rotation, a shoulder disposed between two said adjoining steps, said shoulder locally redirects said gas outward toward said first annular seal ring or said second annular seal ring,
said grooves separately disposed about a central axis aligned adjacent to said first annular seal ring and said second annular seal ring,
said grooves disposed diagonally with respect to rotational direction of said rotatable runner,
said grooves being communicable with a feed groove which directs said gas into said grooves,
at least one said groove structure has a secondary groove structure.

17. The circumferential back-to-back seal assembly of claim 16, wherein said depth (h) increases from at least one said adjoining step to another said adjoining step in the direction opposite to rotation.

18. The circumferential back-to-back seal assembly of claim 16, wherein each said groove having a length (L) and disposed along said rotatable runner having a runner radius ($r_r$) each said groove with one said adjoining step having a minimum depth ($h_{min}$) and other said adjoining step having a maximum depth ($h_{max}$), whereby a distance ratio (R) representing a radial distance (r) of said base over said runner radius ($r_r$) is determined from the equation:

$$R = \frac{\sqrt{\left(r_r^2 - \left(\frac{L}{2}\right)^2\right)} - h}{r_r}.$$

19. The circumferential back-to-back seal assembly of claim 18, wherein said distance ratio (R) for each said groove includes a lower distance ratio ($R_L$) when said depth (h) equals said maximum depth ($h_{max}$) and an upper distance ratio ($R_U$) when said depth (h) equals said minimum depth ($h_{min}$), said distance ratio (R) for each said adjoining step within the range from said lower distance ratio ($R_L$) to said upper distance ratio ($R_U$).

20. The circumferential back-to-back seal assembly of claim 16, further comprising:
(f) a plurality of springs disposed between and directly contacts said first annular seal ring and said second annular seal ring, said springs separate said first annular seal ring and said second annular seal ring.

21. The circumferential back-to-back seal assembly of claim 16, further comprising:
(f) a center ring disposed within said annular seal housing between said first annular seal ring and said second annular seal ring.

22. The circumferential back-to-back seal assembly of claim 16, further comprising:
(f) a center ring disposed within said annular seal housing between said first annular seal ring and said second annular seal ring; and
(g) a plurality of springs disposed between said center ring and each of said first annular seal ring and said second annular seal ring, said springs separate said first annular seal ring and said second annular seal ring away from said center ring.

23. The circumferential back-to-back seal assembly of claim 16, wherein said grooves of said secondary groove structure disposed about and communicable with an apex.

24. The circumferential back-to-back seal assembly of claim 16, wherein said grooves vary lengthwise.

25. The circumferential back-to-back seal assembly of claim 16, wherein at least one said groove is tapered widthwise.

26. The circumferential back-to-back seal assembly of claim 16, wherein at least one said groove has a constant width.

27. The circumferential back-to-back seal assembly of claim 16, wherein adjacent said groove structures vary widthwise.

28. The circumferential back-to-back seal assembly of claim 16, wherein said grooves are separately disposed about said central axis aligned adjacent to said first annular seal ring and said second annular seal ring, adjacent said groove structures vary in number of said grooves.

29. The circumferential back-to-back seal assembly of claim 16, wherein said annular seal housing includes a windback thread adjacent to said compartment including a lubricant, said windback thread directs said lubricant away from said first annular seal ring and said second annular seal ring.

30. The circumferential back-to-back seal assembly of claim 29, wherein a plurality of slots positioned along said rotatable runner cooperate with said windback thread to sling said lubricant away from said first annular seal ring and said second annular seal ring.

* * * * *